United States Patent
Chang et al.

(10) Patent No.: US 8,260,687 B2
(45) Date of Patent: Sep. 4, 2012

(54) DISTRIBUTED COMMERCE APPLICATION-WIDGET

(75) Inventors: Stephen Chang, San Francisco, CA (US); Robert Chatwani, Fremont, CA (US); Daniel Burkhart, San Francisco, CA (US)

(73) Assignee: eBay Inc., San Jose, CA (US)

( * ) Notice: Subject to any disclaimer, the term of this patent is extended or adjusted under 35 U.S.C. 154(b) by 1223 days.

(21) Appl. No.: 11/967,911

(22) Filed: Dec. 31, 2007

(65) Prior Publication Data

US 2008/0255962 A1  Oct. 16, 2008

Related U.S. Application Data

(60) Provisional application No. 60/912,077, filed on Apr. 16, 2007.

(51) Int. Cl.
*G06Q 30/00* (2006.01)
(52) U.S. Cl. ................ 705/26.8; 705/27.1
(58) Field of Classification Search .............. 705/26, 705/27
See application file for complete search history.

(56) References Cited

U.S. PATENT DOCUMENTS

| | | | |
|---|---|---|---|
| 5,910,987 A * | 6/1999 | Ginter et al. | 705/52 |
| 6,026,376 A | 2/2000 | Kenney | |
| 6,073,124 A | 6/2000 | Krishnan et al. | |
| 6,141,006 A * | 10/2000 | Knowlton et al. | 705/27.1 |
| 7,249,139 B2 | 7/2007 | Chuah et al. | |
| 7,266,511 B2 | 9/2007 | Teshima | |
| 7,269,573 B1 | 9/2007 | Bunn et al. | |
| 2001/0011239 A1 | 8/2001 | Kondoh et al. | |
| 2001/0020231 A1* | 9/2001 | Perri et al. | 705/14 |
| 2001/0037368 A1 | 11/2001 | Huang | |
| 2001/0056377 A1 | 12/2001 | Kondoh et al. | |
| 2002/0107752 A1 | 8/2002 | Rivera et al. | |
| 2003/0014423 A1 | 1/2003 | Chuah et al. | |
| 2004/0044730 A1 | 3/2004 | Gockel et al. | |
| 2005/0197893 A1 | 9/2005 | Landau et al. | |
| 2006/0085259 A1 | 4/2006 | Nicholas et al. | |
| 2006/0143095 A1 | 6/2006 | Sandus et al. | |
| 2006/0218577 A1 | 9/2006 | Goodman et al. | |
| 2007/0073580 A1 | 3/2007 | Perry et al. | |
| 2007/0100650 A1 | 5/2007 | Ramer et al. | |
| 2008/0010167 A1 | 1/2008 | Bunn et al. | |
| 2008/0255957 A1 | 10/2008 | Erdem et al. | |
| 2008/0255967 A1 | 10/2008 | Shi | |

FOREIGN PATENT DOCUMENTS

| | | |
|---|---|---|
| EP | 1296241 A1 | 3/2003 |
| WO | WO-0111511 | 2/2001 |
| WO | WO-2008130531 A1 | 10/2008 |
| WO | WO-2008130575 A1 | 10/2008 |

OTHER PUBLICATIONS

QuickBuy: Internet Archive Wayback Machine, www.archive.org/www.quickbuy.com; Mar./Apr. 2000, 14pgs.*

(Continued)

*Primary Examiner* — Robert M. Pond
(74) *Attorney, Agent, or Firm* — Schwegman Lundberg & Woessner, P.A.

(57) ABSTRACT

In some example embodiments, a system and method are illustrated as including generating an item page that includes widget code and details related to an item for sale. Some example embodiments may include making the widget code available for retrieval from the item page.

18 Claims, 21 Drawing Sheets

OTHER PUBLICATIONS

Shama, David; "Wotsa widget?" Jerusalem Post, Aug. 19, 2005, Proquest #895924121, 4pgs.*
PR Newsire; "Vendio Launches Widgipedia.com," Feb. 1, 2007, Proquest #1207770171, 4pgs.*
PR Newsire; Widgetbox Opens Web Widget Marketplace; New Service Makes it Easy to Assemble, Share and Integrate Web Widgets, Sep. 25, 2006, Proquest #1134701801, 4pgs.*
"International Application Serial No. PCT/US2008/004831, Search Report mailed Jul. 14, 2008.", p. 220, 4 pgs.
"International Application Serial No. PCT/US2008/004831, Written Opinion mailed Jul. 14, 2008.", p. 237, 5 pgs.
"International Application Serial No. PCT/US2008/004912 Search Report mailed Jul. 14, 2008", 4 pgs.
"International Application Serial No. PCT/US2008/004912 Written Opinion mailed Jul. 14, 2008", p. 237, 7 pgs.
"U.S. Appl. No. 12/102,387, Non Final Office Action mailed Mar. 23, 2011", 17 pgs.
"International Application Serial No. PCT/US2008/004831, International Preliminary Report on Patentability mailed Oct. 20, 2009", 4 pgs.
"International Application Serial No. PCT/US2008/004912, International Preliminary Report on Patentability mailed Oct. 20, 2009", 6 pgs.
"Velocity Reviews Website", [Online]. Retrieved from the Internet: <URL: http://www.velocityreviews.com/forums/t337777-extract-title-from-html-documents.html>, (Nov. 2004), 4 pgs.
"U.S. Appl. No. 12/102,387, Final Office Action mailed Sep. 22, 2011", 23 pgs.
"U.S. Appl. No. 12/102,387, Response filed Dec. 12, 2011 to Final Office Action mailed Sep. 22, 2011", 14 pgs.
"U.S. Appl. No. 12/102,387, Response filed Jun. 22, 2011 to Non Final Office Action mailed Mar. 23, 2011", 13 pgs.
"U.S. Appl. No. 12/104,205, Non Final Office Action mailed Oct. 4, 2011", 12 pgs.

* cited by examiner

FIG. 6

1973 Alfa Romeo : Spider

You are signed in

View larger picture

Current bid: US $2,500.00  [Place Bid >]
Get low monthly payments

End time: Apr-01-07 11:56 PDT (1 day 21 hours)
Shipping: Buyer responsible for vehicle pick-up
Vehicle shipping quote is available
Sells to: United States
Item location: Greenville, OH, United States
History: 3 bids
High bidder: Bidmiester45

You can also: Watch This Item
Get alerts via Text message or IM
Email to a friend Embed this item
anywhere on the web  <object width="355" hei — 601

Listing and Payment Details: Show

Meet the seller

Seller: Ron Doe
Feedback: 97.3%
Member: Since 2001
* Read feedback
* Ask seller info
* Add to favorites
* View sellers items Buy safely 1. Check the reputation and read feedback 2. Learn how to use preferred paying methods that are secure

```
<OBJECT WIDTH="355" HEIGHT="300">
  <PARAM NAME="MOVIE" VALUE="HTTP://TOGO.ACME.COM/TOGO/TOGO.SWF?2007111900" />
  <PARAM NAME="FLASHVARS" VALUE="BASE=HTTP://TOGO.ACME.COM/TOGO/&LANG=EN-US&MODE=SEARCH&QUERY=IPHONE" />  701
  <EMBED SRC="HTTP://TOGO.ACME.COM/TOGO/TOGO.SWF?2007111900"
    TYPE="APPLICATION/X-SHOCKWAVE-FLASH" WIDTH="355" HEIGHT="300"
    FLASHVARS="BASE=HTTP://TOGO.ACME.COM/TOGO/&LANG=EN-US&MODE=SEARCH&QUERY=IPHONE">  702
  </EMBED>
</OBJECT>
```

FIG. 8

DISTRIBUTED COMMERCE APPLICATION-WIDGET

CROSS REFERENCE TO RELATED APPLICATIONS

This application claims the benefit under 35 U.S.C. §119(e) of U.S. Provisional Patent Application Ser. No. 60/912,077 filed Apr. 16, 2007 ("PUBLICATION AND INFORMATION SYSTEM"), which is incorporated by reference in its entirety herein.

TECHNICAL FIELD

The present application relates generally to the technical field of algorithms and programming and, in one specific example, the use of widgets to implement a distributed commerce and viral marketing regime.

BACKGROUND

Software applications may be executed within the context of other software applications to perform certain predefined functions. For example, a software application written in JavaScript may be executed within the context of a web browser to provide a user of the web browser a richer and dynamic viewing experience. This richer and dynamic viewing experience may be used to sell good and services.

BRIEF DESCRIPTION OF THE DRAWINGS

Some embodiments are illustrated by way of example and not limitation in the figures of the accompanying drawings in which:

FIG. 6 is a diagram of an item page, according to an example embodiment, with widget code.

FIG. 7 is a diagram of widget code, according to an example embodiment.

FIG. 8 is a diagram of a social networking page, according to an example embodiment, with a widget.

DETAILED DESCRIPTION

Figure 1:
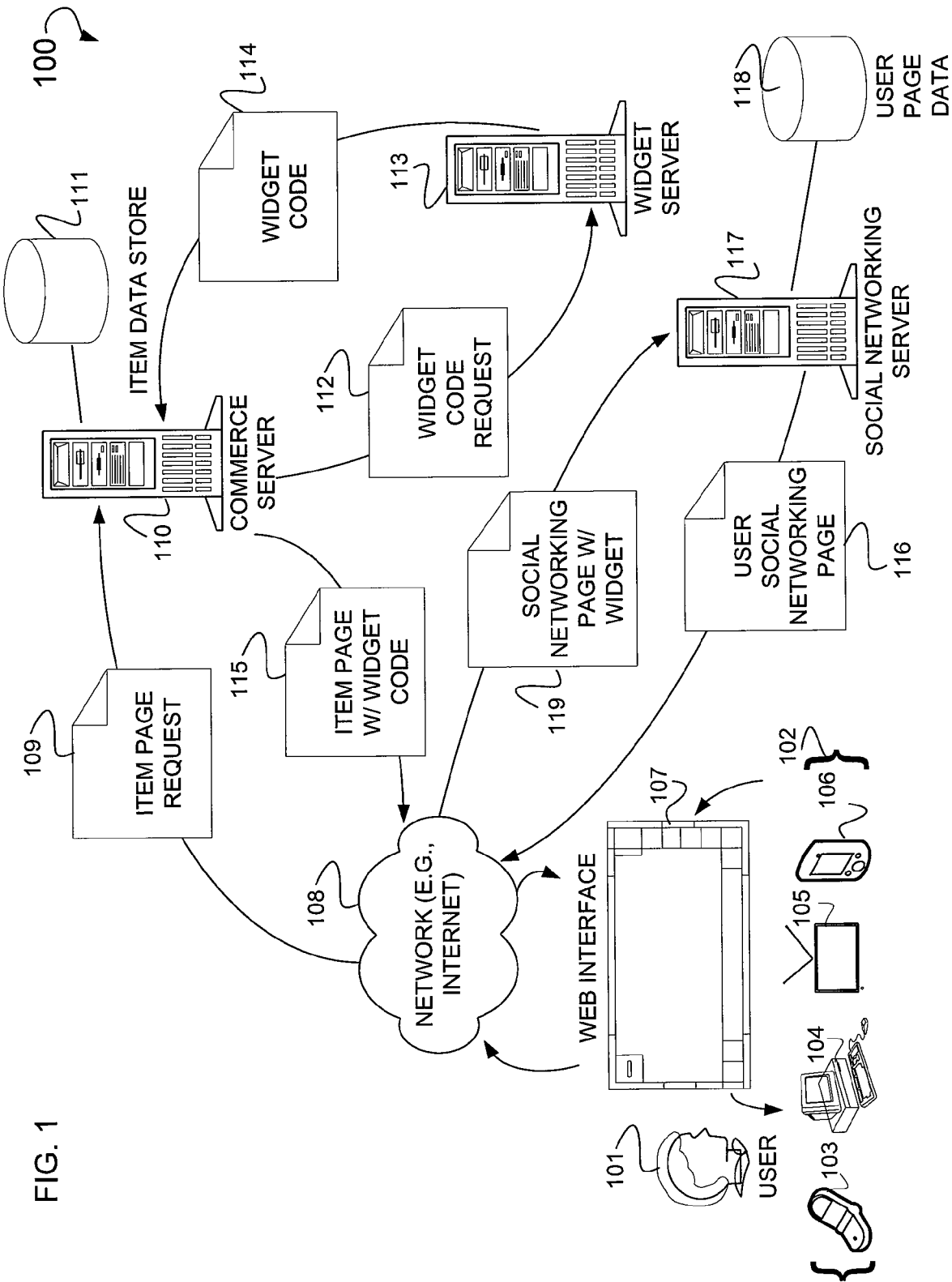
FIG. 1 is a diagram of a system, according to an example embodiment, used for distributed commerce.

A system and method for using widgets to facilitate distributed commerce are illustrated. In the following description, for purposes of explanation, numerous specific details are set forth to provide a thorough understanding of some embodiments. It may be evident, however, to one skilled in the art that some embodiments may be practiced without these specific details.

In some example embodiments, a system and method are shown that facilitate distributed commerce and/or viral marketing through the use of widgets embedded in web pages. These web pages may be associated with social networking web sites or web sites transacting commerce. These widgets may be used to sell good or services.

In some example embodiments, a widget may be a portable piece of code that can be installed and executed within any separate eXtensible Markup Language (XML) and/or Hyper Text Markup Language (HTML) based web page. Widgets may be implemented using technology and programming techniques that includes Dynamic HTML (DHTML), Asynchronous JavaScript and XML (AJAX), FLASH™, a Java applet or some other suitable technology.

In some example embodiments, a widget may be an interface element that is part of a Graphical User Interface (GUI). Examples of this type of widget may include a button, scroll bar, any object appearing in a GUI that may be executed using an input device (e.g., a mouse, light pen, keyboard or touch screen). Further, combinations of objects appearing in a GUI may form a widget. Technologies and techniques used to implement a widget may include Java, C++, C#, Visual Basic or some other suitable programming language.

Some example embodiments may include, a system and method to facilitate distributed commerce. Distributed commerce may include distributing widgets in the form of widget code to various users for placement into web pages operated or managed by users of the web pages. These widgets may track a good or service for sale, and/or allow a person (e.g., a natural person or legal entity) to purchase the good or service using the widget.

In some example cases, viral marketing may be used to distribute these widgets. Viral marketing may include allowing persons to freely distribute and use widget code, and to be compensated for the this distribution and use. In one example embodiment, a user may retrieve widget code from a commerce server or a social networking server (e.g., an originating server), and then implement this widget code. This widget code may be implemented on a commerce server or social networking server that is distinct from the originating server. Once this widget code is implemented, the user may be compensated monetarily for this use (e.g., widget use) based upon, for example, page views of the good or service for sale as advertised by the widget, click throughs using the widget, bids using the widget, or some other suitable basis to count the usage of the widget.

In some example embodiments, the widget use is tracked based upon ID values associated with the widget itself (e.g., a widget ID), the user of the widget (e.g., a user ID), a buyer of the good or service advertised by the widget (e.g., buyer ID), or some other suitable basis to track widget use. These ID values may be Globally Unique Identifier (GUID) value that may serve to distinguish these ID from one another and other values. A GUID may be a 16 byte number that may be hexadecimal, decimal or binary in form. In some example embodiments, a number of some other suitable length may be used. As used herein ID may GUID may be considered to be interchangeable.

Example System

FIG. 1 is a diagram of an example system 100 used for distributed commerce. Shown is a user 101, who utilizing a web interface 107, may generate an item page request 109. This web interface 107 may reside on any one of a number of devices 102. The web interface 107 may include a web browser or other suitable application capable of interpreting and displaying HTML, XML, or some other suitable markup language. The devices 102 may include a cell phone 103, a computer system 104, a monitor or television 105 and/or a Personal Digital Assistant (PDA) 106. Some example embodiments may include the user 101 utilizing the web interface 107 to generate the item page request 109. This item page request 109 may be a Hypertext Transfer Protocol (HTTP) based message that may be used to retrieve an item page from a commerce server 110. The commerce server 110 may be a server operated to sell good and services over a network. The commerce server 110 may be operated by web sites having trade names including EBAY™, AMAZON™, GOOGLE™, or some other suitable web site that transacts in good and services. A network may be an Internet, Local Area Network (LAN), Wide Area Network (WAN), or other suitable network. This item page request 109 may be transmitted across a network 108. Once the item page request 109 is received at the commerce server 110, item data may be retrieved from the item data store 111. This item data may be retrieved from the item data store 111 utilizing some type of query language such as a Structured Query Language (SQL), a Multidimensional Expression (MDX) language, or some other suitable query language.

In some example embodiments, once the commerce server 110 retrieves item data from the item data store 111, the commerce server 110 may transmit a widget code request 112 to a widget server 113. This item data may be in the form of a web page (e.g., an item page) advertising a good or service for sale. This widget server 113 may generate widget code 114 to accompany the item data. This widget code 114 may be sent to the commerce server 110 in response to the widget code request 112. This widget code 114 may then be combined with an item page to form an item page with widget code 115. This item page with widget code 115 may be sent back across the network 108 to be displayed on the web interface 107. The widget server 113 may use any one of a number of the above references technologies and techniques to generate the widget code 114.

In some example embodiments, the widget code request 112 includes item data and code type data. Item data may include data relating to how a web page upon which the widget is to appear is to be formatted. For example, the Cascading Style Sheet (CSS) information for a web page may be included in the item data. The code type data may include identifiers used to identify the technology and techniques to be used to generate a widget.

In some example embodiments, once the item page with widget code 115 is received and displayed as a part of the web interface 107, the user 101 may retrieve his or her social networking page from a social networking server 117. This social networking page may be a web page. In some example embodiments, the user 101 may retrieve a web page from some other type of server used to transact commerce. In some example embodiments, the user 101 may retrieve a social networking page 116 and display this social networking page 116 as a part of a web browser, an Integrated Development Environment (IDE), an HTML editor, or as part of some other suitable application. The user 101 may extract the widget code from the item page with widget code 115, and paste the widget code into the social networking page to generate a social networking page with widget 119. In some example embodiments, this process of extracting the widget code from item page with widget code 115 and inserting or pasting into the social networking page with widget 119 may be automated. Automation may include the user 101 not engaging in any direct action to extract the widget code and insert it into a social networking page. Rather this process is automatically (e.g., the widget code is automatically inserted) executed by a computer system. This social networking page with widget 119 may then be transmitted across the network 108 by the user 101 utilizing the web interface 107 to be received by the social networking server 117. The social networking server 117 may store this social networking page with widget 119 into a user page data 118 database. Additionally, the social networking server 117 may post or otherwise display for others to review the social networking page with widget 119.

Some example embodiments may include the item page with widget code 115 that also includes a distribution menu. This distribution menu may identify certain web sites including social networking sites or other commercial sites that transact in good or services to which the widget code may be posted. When executed using an input device, a menu selection may prompt the user 101 with a login associated with a selected web site (e.g., a social networking site or other commercial site). In some example embodiments, HTTP or Secure Hyper Text Transfer Protocol (HTTPS) over a Transmission Control Protocol/Internet Protocol (TCP/IP) may be used to facilitate the login process. Where login is successful, widget code may be directly inserted into the user 101's web page associated with the web site.

Figure 2:
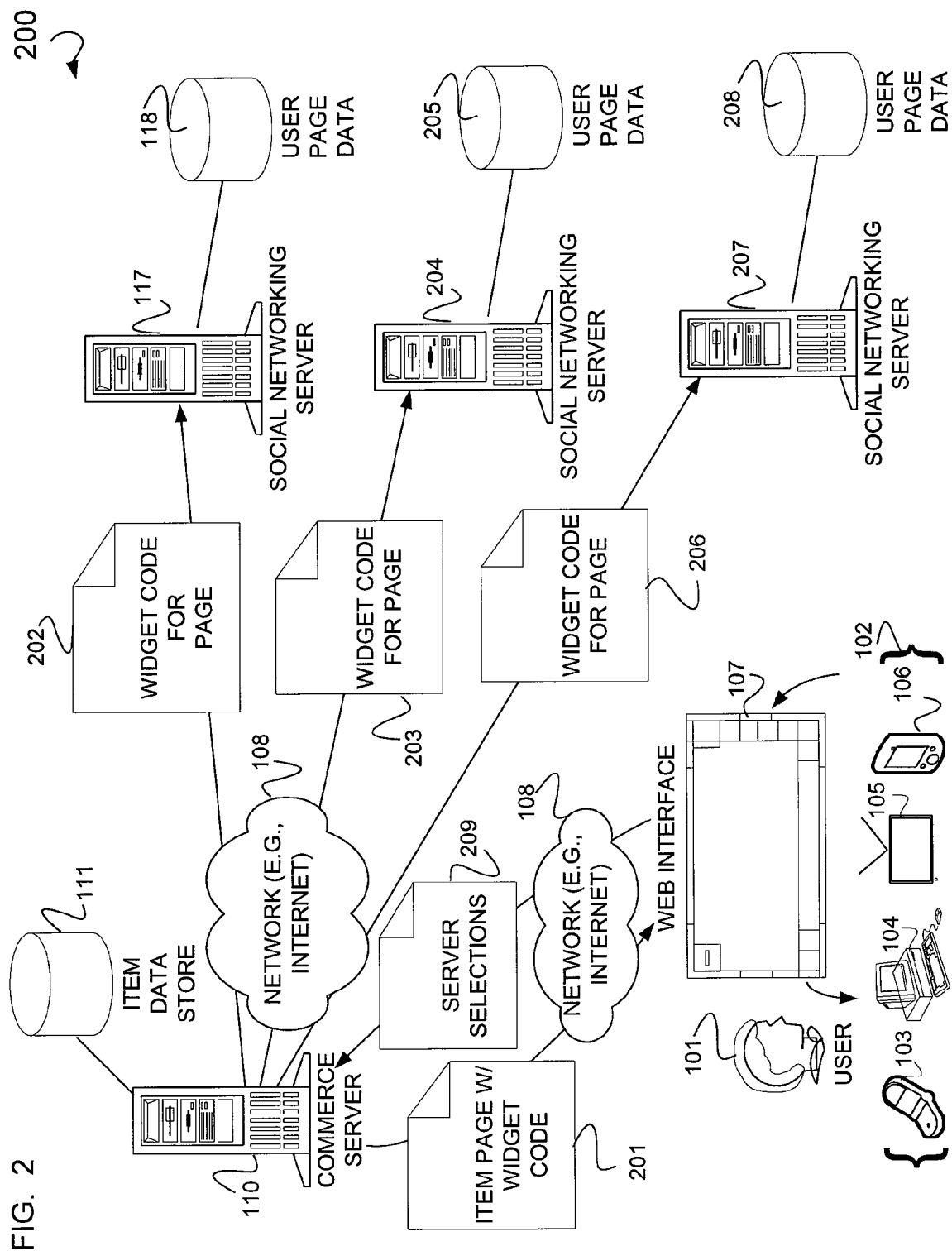
FIG. 2 is a diagram of a system, according to an example embodiment, used for distributed commerce wherein widget code is distributed to a plurality of social networking servers.

FIG. 2 is a diagram of an example system 200 used for distributed commerce wherein widget code is distributed to social networking servers. Shown is the user 101 who, utilizing the web interface 107, may be able to select a plurality of social networking servers reflecting a plurality of social networking sites. These social networking sites may have trade names including FACEBOOK™, MYSPACE™, LINKEDIN™, or some other suitable social networking site. For example, the user 101 utilizing the web interface 107 may request an item page with widget code 201 from the commerce server 110. Once the item page with widget code 201 is retrieved and displayed as a part of the web interface 107, the user 101 may select a plurality of servers to receive the widget code that is a part of the item page with widget code 201. These selections may be made and transmitted as a part of the server selections 209 data packet. This server selections 209 data packet may be sent by the user 101 across the network 108 to be received by the commerce server 110. Once received by the commerce server 110, the commerce server 110 may distribute the widget code included within the item page with widget code 201 to a plurality of social networking servers. This widget code may be distributed as widget code for page 202, 203 or 206. In some example embodiments, this widget code for page 202, 203 or 206 may be distributed to one or more other commerce servers (not pictured).

In some example embodiments, the commerce server 110 may create a TCP/IP connection with a social networking server 117, a social networking server 204, and a social networking server 207. In some example embodiments, HTTP, HTTPS, or a File Transfer Protocol (FTP) session may be established between the commerce server 110 and each of the social networking servers 117, 204, and 207. Once this HTTP, HTTPS or FTP session is established between the commerce server 110 and each of the social networking servers (e.g., 117, 204 and 207) the commerce server 110 may transmit widget code for a page 202, widget code for page 203, and widget code for page 206 across the network 208 to separate social networking servers. For example, the widget code for page 202 may be transmitted across the network 108 to be received and posted by the social networking server 117. The widget code for page 203 may be transmitted across the network 108 to be received by and posted by the social networking server 204. Additionally, the widget code for page 206 may be transmitted across the network 108 to be received by and posted by the social networking server 207. The widget code for page 202 may be stored into the user page data 118 data base using SQL or MDX. The widget code for page 203 may be stored into the user page data 205 data base using SQL or MDX. The widget code for page 206 may be stored into the user page data 208 database using SQL or MDX. This process for generating widget code and posting it to a plurality of social networking servers will be illustrated below more fully.

Some example embodiments may include the item page with widget code 201 including a share button. This share button, when executed using an input device, may generate a prompt asking the user 201 where they would like to embed the widget code (e.g., what web page associated with what web site and servers associated with the web site). Where a web site is selected, the user 201 may be prompted with a login associated with this web site. In some example embodiments, HTTP, HTTPS or FTP over TCP/IP may be used to facilitate the login process. Where login is successful, widget code may be directly inserted into the user 201's web page associated with the web site. This insertion process may not involve user 101.

Figure 3:
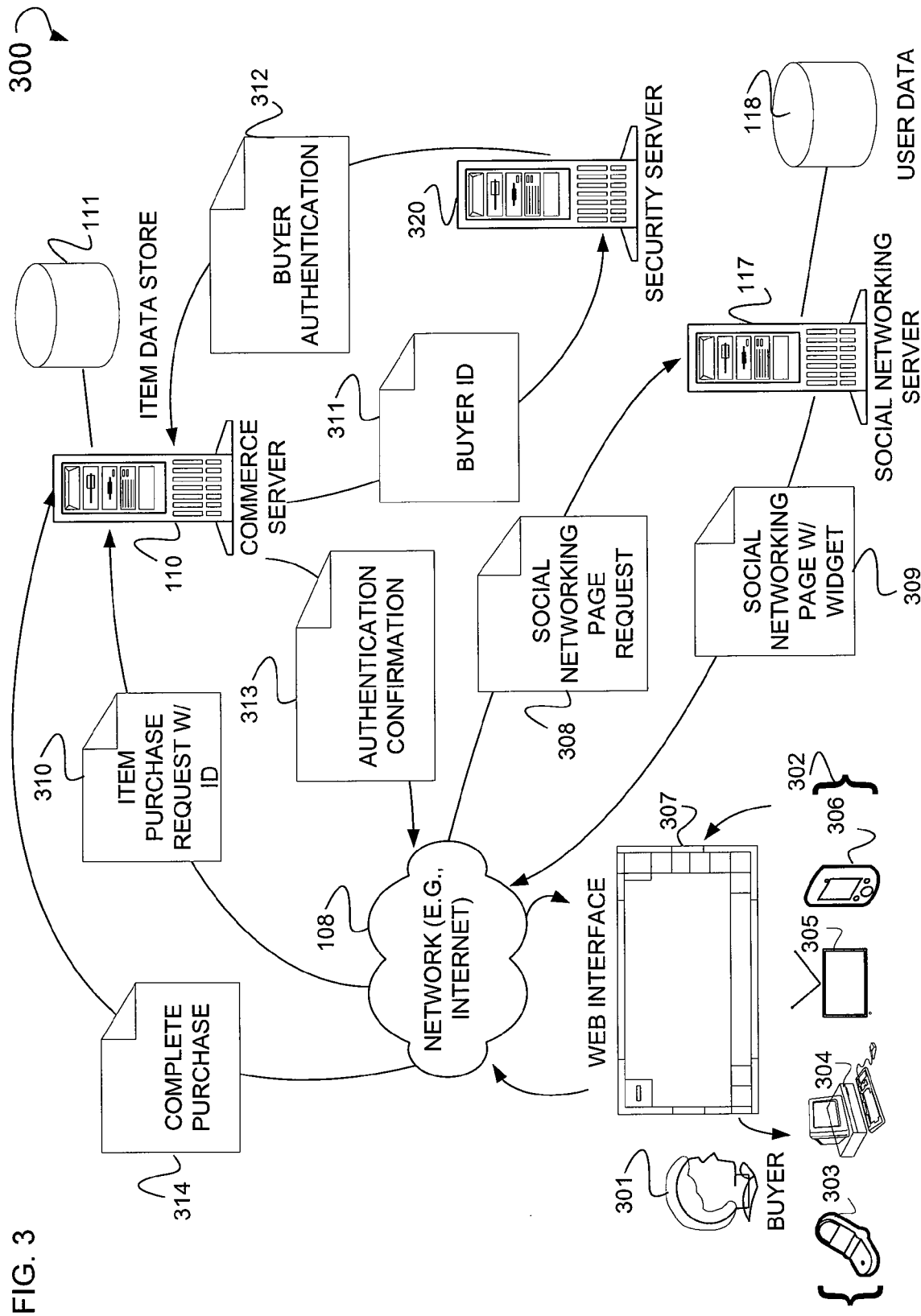
FIG. 3 is a diagram of a system, according to an example embodiment, illustrating the purchase of an item using a widget that may appear as a part of a social networking page.

FIG. 3 is a diagram of an example system 300 illustrating the purchase of an item using a widget that may appear as a part of a social networking page. Shown is a buyer 301 who, utilizing a web interface 307, may purchase an item using a widget that may appear as a part of a social networking page. This web interface 307 may reside as a part of, or otherwise be generative by, any one of a number of devices 302. These devices 302 may include a cell phone 303, a computer system 304, a monitor or television system 305 and/or a PDA 306. Utilizing the web interface 307, the buyer 301 may generate an item purchase request with ID 310. The ID that may be a part of this item purchase request with ID 310 may include the buyer's ID (e.g., a Personal ID (PID)), an item ID, or a widget ID. In some example embodiments, a seller ID may be apart of this ID information. This item purchase request with ID 310 may be transmitted, using the web interface 307, by the buyer 301 across the network 108 using technologies that include HTTP or HTTPS. This item purchase request with ID 310 may be received by the commerce server 110. Once received, the commerce server 110 may forward the ID information (e.g., the buyer ID, an item ID, seller ID or a widget ID) as part of the item purchase request with ID 310 to a security server 320. For example, illustrated here is the buyer ID 311 being forwarded to the security server 320 for verification. Once received by the security server 320, the security server 320 may authenticate or otherwise verify the buyer ID, the item ID, seller ID or the widget ID. Here, for example, a buyer authentication 312 is generated and transmitted back to the commerce server 110. The buyer authentication 312 signifies that the buyer 301 is a valid buyer capable of purchasing a good or service.

In some example embodiments, the commerce server 110 and security server 320 may be connected via an internet, a LAN or a WAN (not pictured). The verification process to verify IDs may be executed by the security server 320 or may occur as a part of the commerce server 110. Once some type of authentication occurs, the commerce server 110 may send an authentication confirmation 313 back across the network 108 to be received by the buyer 301. Once the authentication confirmation 313 is received by the buyer 301, a complete purchase 314 command may be generated and sent back across the network 108 to be received by the commerce server 110, thereby concluding the purchase of an item advertised by the widget appearing on the social networking page.

In some example embodiments, the initial generation of the item purchased with the request ID 310 may be facilitated by, for example, the buyer 301 generating and transmitting across the network 108, a social networking page request 308. In response, the social networking server 117 may retrieve the requested social networking page from the user data 118 database. A widget may be associated with the requested social networking page so as to generate a social networking page with widget 309. This social networking page with widget 309 may be transmitted by the social network server 117 back across the network 108 to be displayed within the web interface 307. This social networking page with widget 309 may then be reviewed and the widget included on the social networking page activated so as to generate the previously referenced item purchase request with ID 310.

Figure 4:
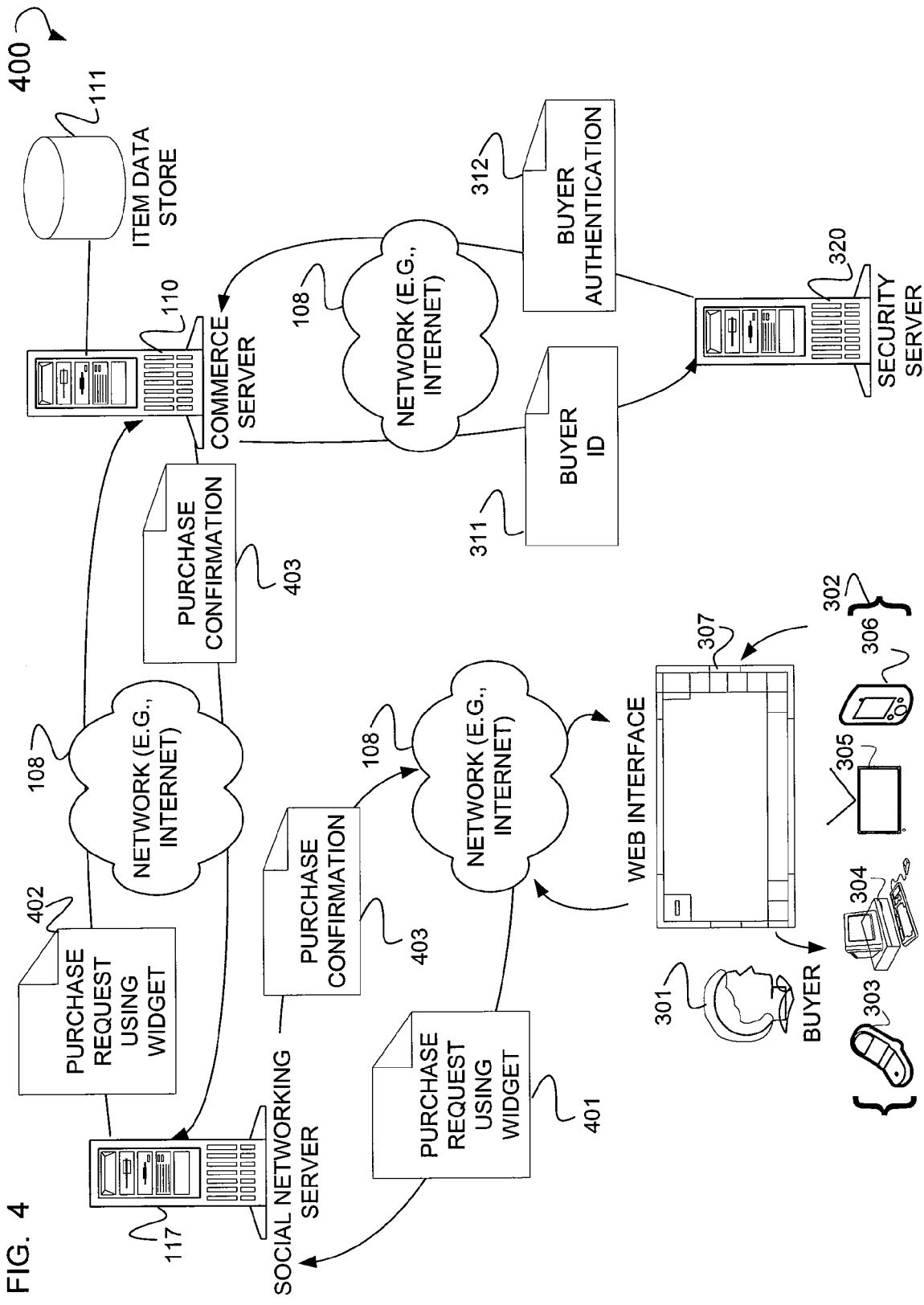
FIG. 4 is a diagram of a system, according to an example embodiment, wherein the purchase process for an item for sale is facilitated between a social networking server and a commerce server by a widget.

FIG. 4 is a diagram of an example system 400 wherein the purchase process for an item for sale is facilitated between the social networking server 117 and the commerce server 110. Shown is the buyer 301 who, utilizing the web interface 307, generates a purchase request using widget 401. This purchase request using widget 401 may be generated by, for example, a buyer 301 activating a widget. Activating a widget may include: clicking on, focusing on, or performing a mouse over on some type of object appearing as a part of the widget. This purchase request using a widget 401 may be received by the social networking server 117 over the network 108. Once received, a purchase request using widget 402 may be generated and transmitted by the social networking server 117 and sent across the network 108 to be received by the commerce server 110. In some example embodiments, HTTP or HTPS may be utilized to transmit the purchase request using widget 402. Once the purchase request using widget 402 is received by the commerce server 110, some type of verification process may occur such that IDs including, for example, buyer IDs, seller IDs, widget IDs or item IDs may be verified by the security server 320. Illustrated here, for example, is a buyer ID 311 that is verified by the security server 320, and a buyer authentication 312 is returned by the security server 320 to the commerce server 110. Once the verification takes place, the commerce server 110 may transmit a purchase confirmation 403 back across the network 108 to be received by the social networking server 117. Once received, this purchase confirmation 403 may be forwarded back across the network 108 to the buyer 301 utilizing the web interface 307. In some example embodiments, the purchase confirmation 403 may be reformatted by the social networking server 117 to reflect a format that can be processed by the one or more devices 302. Reformatting may include the use of additional or distinct protocols that may be used by one or more of the devices 302.

In some example embodiments, a widget may be used to purchase a good or service. For example, buyer 301 may execute a button on a widget to purchase a good or service. Once this button is executed, the widget may establish an HTTP, or HTTPS over TCP/IP connection with the commerce server 110. The buyer 301 may be prompted to provide a user ID (e.g., a buyer ID). The buyer 301 may be prompted to identify an image in some examples. Where the user ID and image are successfully identified, the buyer 301 may be prompted to enter a widget password. Where all or some of the IDs and passwords are valid, the buyer 301 may be prompted with a complete purchase page that, when executed (e.g., a button residing on the page is executed), generates a complete purchase signal.

Figure 5:
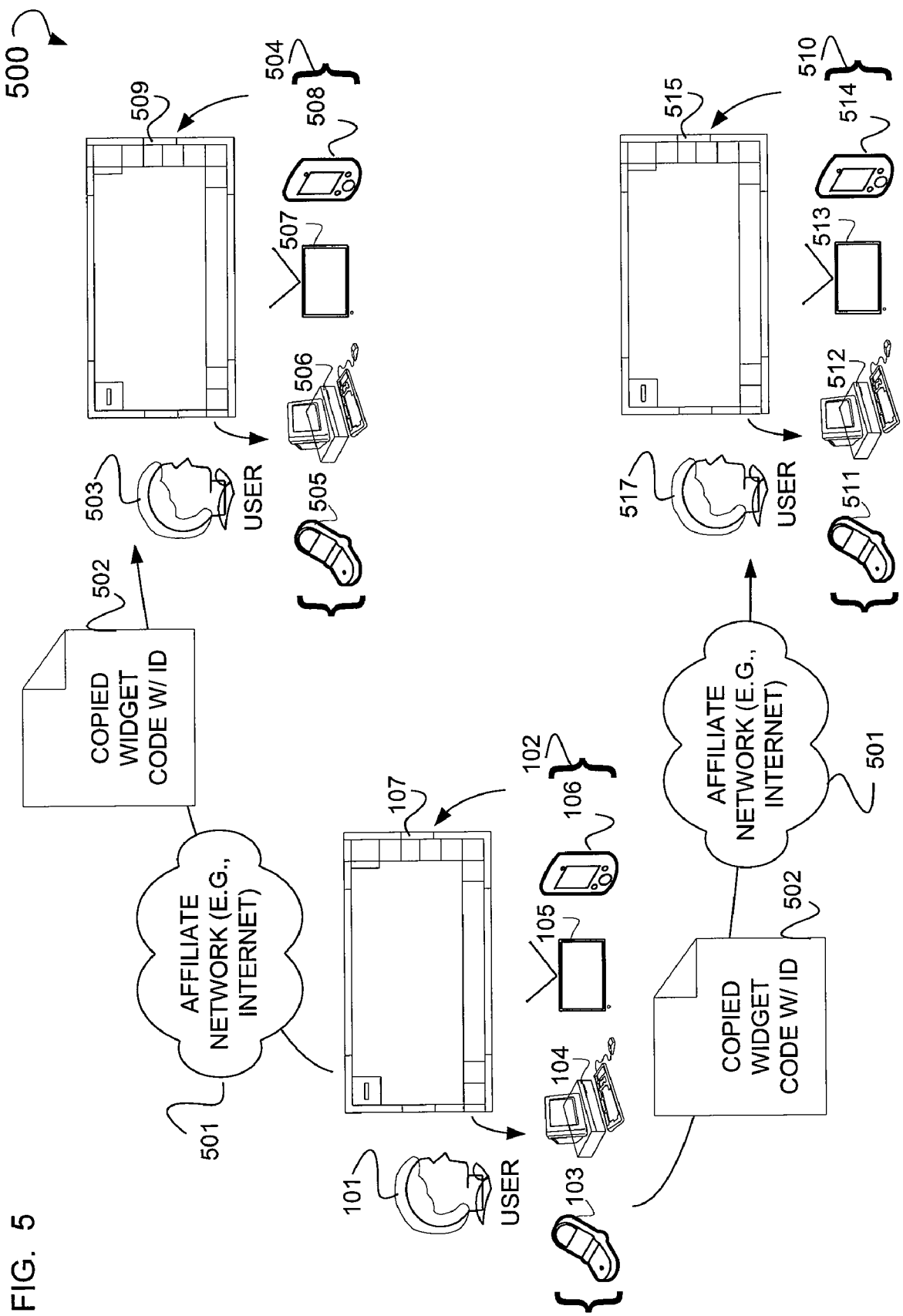
FIG. 5 is a diagram of a system, according to an example embodiment, utilizing viral marketing for the purposes of distributing widget code.

FIG. 5 is a diagram of an example system 500 utilizing viral marketing for the purposes of distributing widget code. Shown is the previously referenced user 101 who is related to a plurality of users referenced herein as affiliates. These affiliates include user 503 and user 517. The user 101 is connected to the user 503 via an affiliate network 501. Similarly, the user 101 is also connected to the user 517 via the affiliate network 501. This affiliate network 501 may be an Internet, a LAN, a WAN, or some other suitable network. In some example embodiments, the user 101 provides widget code to the user 503. For example, the user 503 may copy widget code from the social networking page with widget 119. Copying may be facilitated through a copy function provided by a web interface 509. This copied widget code may then be inserted into a social networking page that is managed or controlled by user 503. This management or control may be a function of certain read, write or edit privileges associated with the user 503 as granted by a social networking server. Similarly, the user 517 may also copy the widget code from the social networking page with widget 119 to be inserted into a web page managed or controlled by the user 514. In some example embodiments, the user 503 and the user 517 may manually copy the widget code, and then paste it into their own social networking page (e.g., a social networking page they manage or control). In other example embodiments, an automated process may be utilized by either the user 503 or the user 517 to take the widget code from the social networking page with widget 119, and automatically inserted into a social networking page as managed or controlled by the user 503 or user 517. In some example embodiments, when this widget code is copied and then displayed by the user 503 or the user 517 in their respective social networking pages, the user 503 and the user 517 become affiliates of the user 101. Web interface 509 may reside as a part of any one of the number of devices 504 that include a cell phone 505, a computer system 506, a television or monitor 507 or a PDA 508. Further, the web interface 515 may reside as part of any one of a number of devices 510 that include a cell phone 511, a computer system 512, a television or monitor 513 or a PDA 514.

Some example embodiments may include the user 101 receiving some type of credit or other monetary compensation for the user 503 and 517 becoming affiliates of the user 101. For example, each time the widget code existing as a part of social networking page with widget 119 is copied, or otherwise utilized by the user 503 or user 517, the user 101 may receive some type of credit or other monetary compensation. Further, each time the widget code, existing as a part of the social networking page with widget 119, is viewed, clicked, on or otherwise activated, the user 101 may also receive credit or monetary compensation. Additionally, in some example embodiments, every time the copied widget code with ID 502 is activated by some user, the user 101 receives credit or other monetary compensation such that the more users that utilize the copied widget code with ID 502, the more credit or other monetary compensation the user 101 receives.

In some example embodiments, the ID value associated with a widget is used to track the viral distribution of a widget from its originating source. For example, each time a widget is copied and activated, a signal is sent to the commerce server 110 informing the commerce server 110 of the activation of the widget. This tracking of the viral distribution may be facilitated through the establishment of a TCP/IP connection between the widget and the commerce server 110, wherein the commerce server 110 is updated as to the activities of the widget. Widget activity or activation may include, as referenced elsewhere, clicks, bids, views, purchases, copying or any other suitable activity. Further, the widget may also receive item updates as to changes in the item being advertised by the widget. Users or sites maintaining the server(s) upon which the web page including the widget resides may receive credit or monetary compensation for the widget activity.

Some example embodiments may include the selling of items using a widget. For example, a widget may be posted on a web page. This widget may be a selling widget such that the widget may facilitate the posting of goods or services for sale on the commerce server 110. In one example embodiment, a selling widget is executed so as to posted goods or services for sale on a commerce server 110. Once executed, the user 101 is prompted with a login for the commerce server 110. The user 101 may then be prompted with a security confirmation image. Further, the user 101 may be prompted with a password for a widget. Where one or more of the login, security confirmation image, or password for the widget is successfully provided, the user 101 may be prompted to provide details relating to the good or service for purchase. These item details, when entered, may then be posted along with the other item data for the good or service being sold. Further, these details may also be stored into the item data store 111. Item details may include: seller contact information, selling price information, condition of item information, time of same information, lowest bid price information, or some other suitable information.

Example Interface and Widget Code

FIG. 6 is a diagram of an example item page with widget code 115. Shown is an item page with widget code 115 including, for example, a text box 601 including widget code. As shown herein, this widget code is associated with some type of good or service being sold. Here, for example, a "1973 Alfa Romeo Spider" automobile is being sold.

FIG. 7 is a diagram of example widget code 114. Shown is example widget code 114 written using for example HTML. Included within this widget code 114 is, for example, a field 701 reflecting the Uniform Resource Locator (URL) value for a particular widget. This widget is written using FLASH™ technology. Additionally denoted is the size of the display area that this widget may take up or share (e.g., 355 pixels by 300 pixels). Also shown is a second field 702 that includes an additional URL value for a widget to be displayed. In some example embodiments, the widget code 114 may appear as a part of the previous reference textbox 601.

In some example embodiments, other example widget code may be implemented. This example widget code may differ based upon the particular function that the widget code is being used to perform. For example, widget code 114 is single item widget code. In addition to single item widget code, store version widget code may be implemented. An example of this store version widget code may have the form:

```
<object width="355" height="355"><param name="movie"
value="http://togo.acme.com/togo/store.swf?2007111900" /><param
name="flashvars" value="base=http://togo.acme.com/togo/&lang=en-
us&seller=replacementautoparts&query=car" /><embed
src="http://togo.acme.com/togo/store.swf?2007111900" type="application/
x-shockwave-flash" width="355" height="355"
flashvars="base=http://togo.acme.com/togo/&lang=en-
us&seller=replacementautoparts&query=car"></embed></object>
```

Further, a seller version of widget code may be implemented that is specific to a particular seller. This seller version of widget code may have the following form:

```
<object width="355" height="355"><param name="movie"
value="http://togo.acme.com/togo/seller.swf?2007111900" /><param
name="flashvars" value="base=http://togo.acme.com/togo/&lang=en-
us&seller=itrimming" /><embed
src="http://togo.acme.com/togo/seller.swf?2007111900"
type="application/x-shockwave-flash" width="355"
height="355"
flashvars="base=http://togo.acme.com/togo/&lang=en-
us&seller=itrimming"></embed></object>
```

Additionally, a multiple item version of widget code may have the following form:

```
<object width="355" height="300"><param name="movie"
value="http://togo.acme.com/togo/multi.swf?2007111900" /><param
name="flashvars" value="base=http://togo.acme.com/togo/&lang=en-
us&itemid=300181596859,320192378444&query=iphone" /><embed
src="http://togo.acme.com/togo/multi.swf?2007111900"
type="application/x-shockwave-flash" width="355"
height="300"
flashvars="base=http://togo.acme.com/togo/&lang=en-
us&itemid=300181596859,320192378444&query=iphone"></embed></object>
```

These various versions of widget code are only for illustrative purposes. The actual implementation details of how to design and implement a widget may be left up to the individual persons designing a widget.

Figure 8:
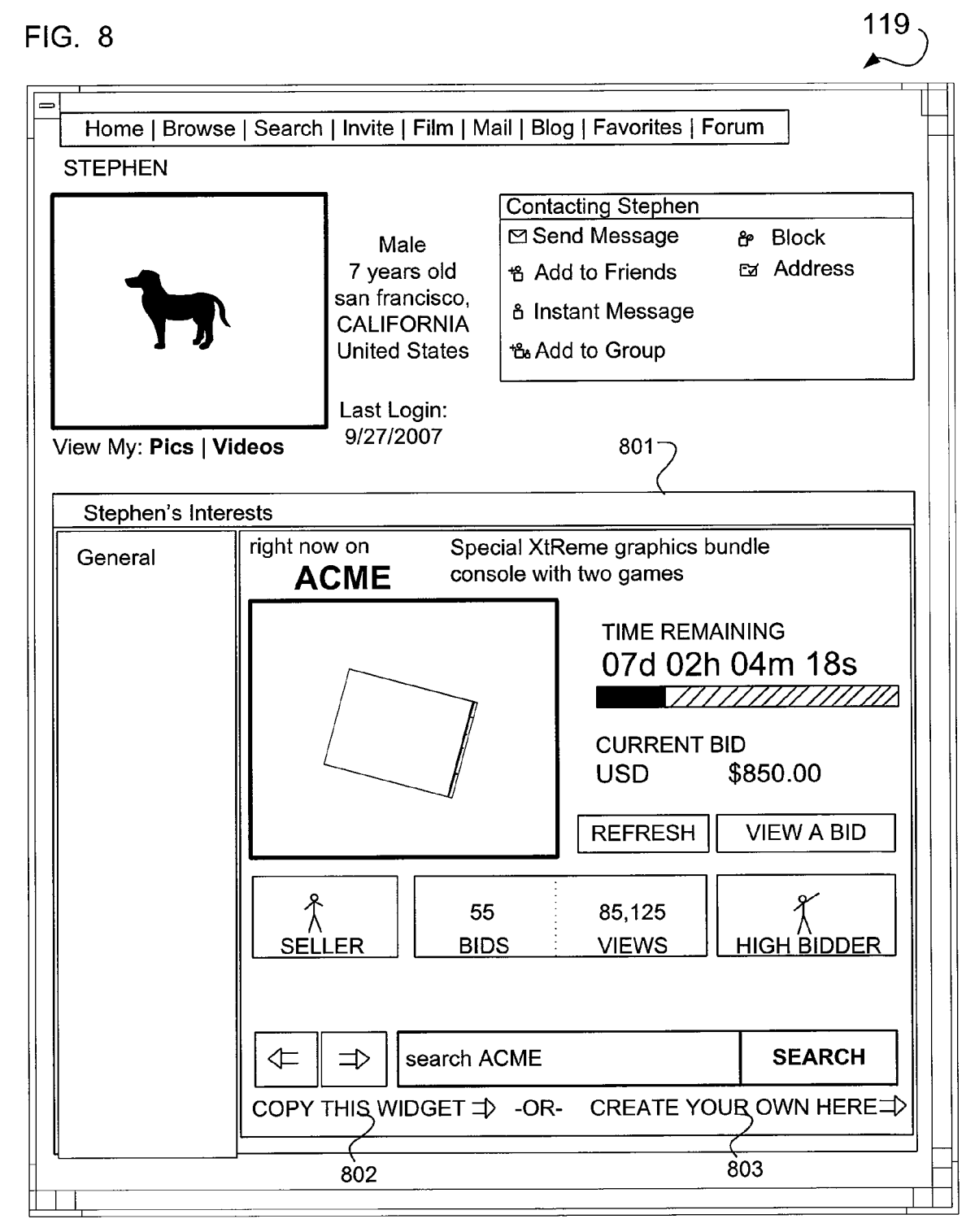

FIG. 8 is a diagram of an example social networking page with widget 119. Illustrated is a social networking page with widget 119 that includes an example a widget 801. This widget 801 may include up to date information pertaining to a particular item for sale as advertised by a commerce server 110. Further included as a part of this widget 801 may be a button 802 that allows a user, such as user 503 or user 517, to copy the widget code that appears as a part of the widget 801. Further, a button 803 may be provided that allows the user 517 or user 503 to create their own widget associated with a particular item for sale on the social networking page with widget 119. In some example embodiments, the commerce server 110 utilizing a User Datagram Protocol (UDP) over IP (collectively UDP/IP) may send continuous item updates to the one or more devices 102 upon which may reside the social networking page with widget 119. Item updates may include changes in item sales status (e.g., whether the item has been sold), price change information, or time of sale change information. Further, in some example embodiments, the commerce server 110 may send updates for a particular widget, such as widget 801, to the social networking server 117. These updates may include: updates regarding the number of bids that are made for the particular item as advertised by the widget 801 and the number of times that this item advertised with the widget 801 has been viewed; the current bid value of the item advertised by the widget 801; the amount of time remaining as part of an auction that the item is being advertised through; or some other suitable type of information used in the sale of a good or service.

Example Logic

Figure 9:
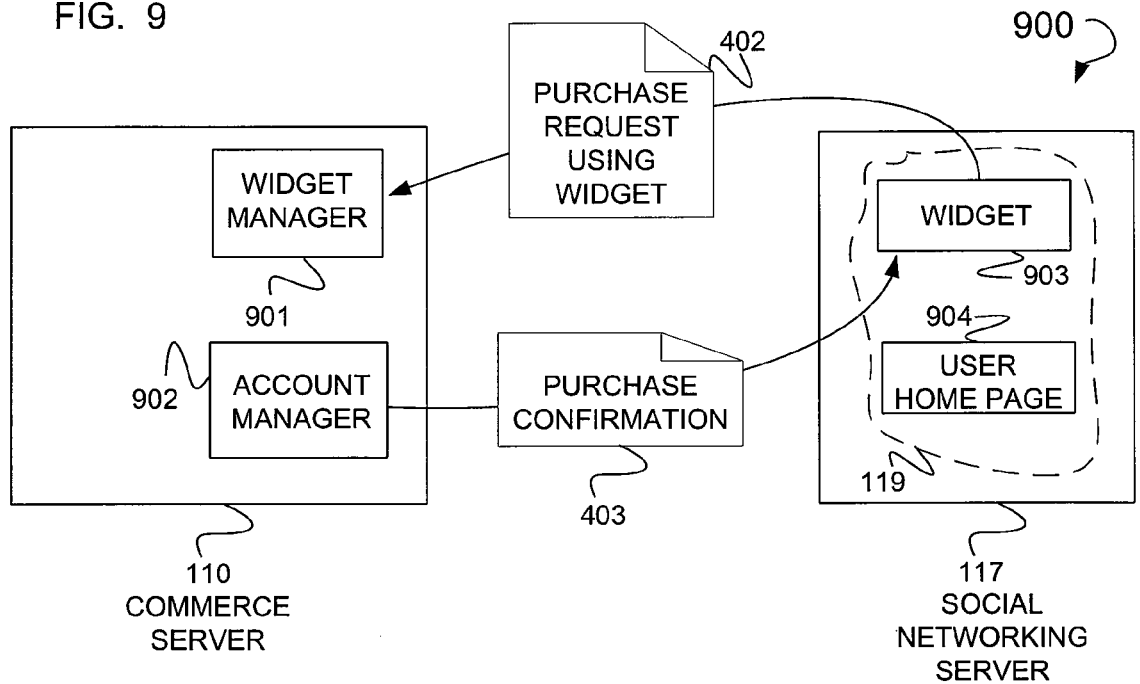
FIG. 9 is a block diagram of a system, according to an example embodiment, using a widget to facilitate the purchase of an item.

FIG. 9 is a block diagram showing an example system 900 using a widget to facilitate the purchase of an item. The blocks depicted as part of this system 900 may be implemented in hardware, firmware or software. These blocks may each utilize certain principles of socket programming in their implementation. Shown is a social networking server 117. Residing on this social networking server 117 is a widget 903 and a user home page 904. In some example embodiments, the widget 903 interacts with the user home page 904 via an Application Programming Interface (API). In some example embodiments, a buyer such as buyer 301 may activate the widget 903 so as to generate a purchase request using widget 402. This purchase request using widget 402 may be transmitted across the network such as network 108 to be received by a widget manager 901 that resides as a part of the commerce server 110. This widget manager 901 may engage in a plurality of verification operations so as to verify the ID of the buyer 301, the ID of the item purchased, the ID of the seller, and/or the ID of the widget used to generate the purchase request using widget 402.

In some example embodiments, shown is an account manager 902 that may reside as a part of a commerce server 110. This account manager 902 may ensure that the user upon whose social networking page the widget is placed gets credit or monetary compensation for the activation of the widget. Activation may include views of the item using the widget, mouse clicks made with regard to the item using the widget, purchases of the item may using the widget, or some other suitable bases for giving credit or monetary compensation to a user such as user 101. In examples where a purchase request using widget 402 is generated and received by the widget manager 901, the account manager 902 may generate a purchase confirmation 403 and transmit this purchase confirmation 403 back across the network such as network 108 to be received by the widget 903. This purchase confirmation may then be sent on to, for example, a buyer 301 to confirm their purchase using the widget. In some example embodiments, the account manager 902 may additionally send widget updates to the widget appearing as a part of the social networking page (e.g., social networking page with widget 119). For example, the widget 801 may be updated using the account manager 902.

Figure 10:
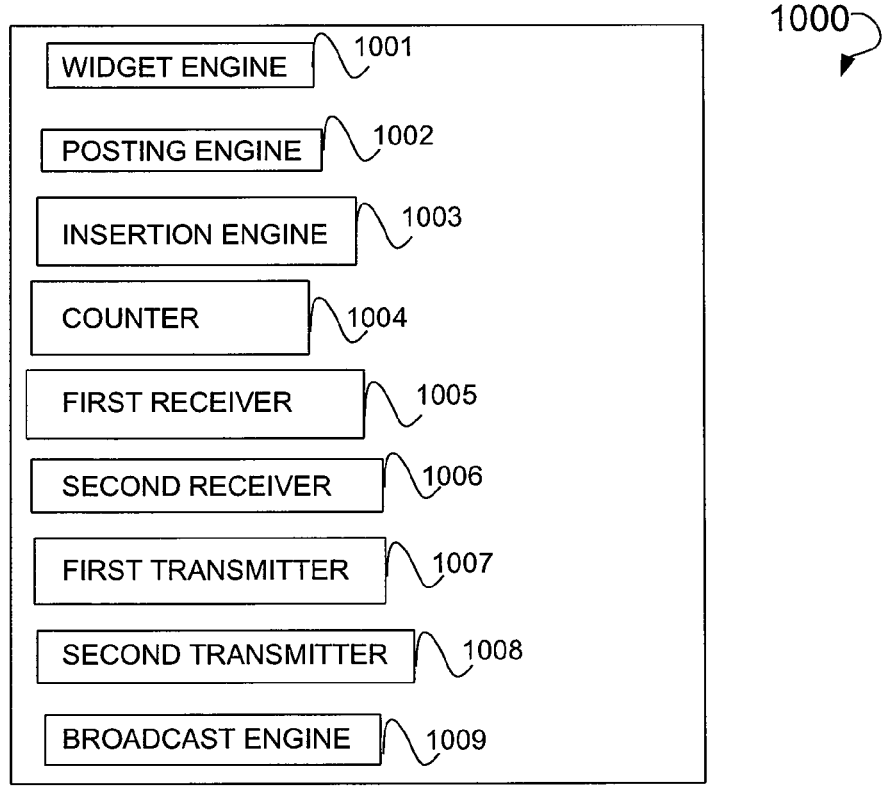
FIG. 10 is a block diagram of a computer system, according to an example embodiment, used to generate a widget to be used in a distributed commerce setting, and to be used to engage in the viral marketing of widgets.

FIG. 10 is a block diagram of a computer system 1000 used to generate a widget to be used in a distributed commerce setting, and to be used to engage in the viral marketing of widgets. The various blocks illustrated herein may be implemented in hardware, firmware, or software. Commerce server 110 may be an example of this compute system 1000. A widget engine 1101 may be implemented to generate an item page that includes widget code and details related to an item for sale. A posting engine 1102 is used to make the widget code available for retrieval from the item page. An insertion engine 1003 may be used to automatically insert the widget code into a web page. In some example embodiments, the web page is a social networking web page with widget code. A counter 1104 is used to count widget activity and credit a user account based upon the widget activity. Some example embodiments may include, widget activity that includes at least one of the following: a page view of the item page, a mouse over of the widget code, a click through of the widget code, a sales transaction using the widget code or the creation of an affiliate using the widget code. A first receiver 1005 may be implemented to receive a purchase request generated by the widget code, where the purchase request is related to the item for sale. A second receiver 1006 may be used to receive authentication of an identification value associated with the purchase request. A first transmitter 1007 may be used to transmit a purchase confirmation based upon the authentication of the identification value. Some example embodiments may include an identification value includes at least one of: a buyer ID, an item ID, seller ID or a widget ID. A second transmitter 1008 may be implemented to transmit an item update relating to the item for sale, where the item update includes at least one of changes in item sales status, price change information or time of sale change information. A broadcast engine 1009 may be used to broadcast the widget code to at least one server (see e.g., social networking servers 117, 205 and 207).

Figure 11:
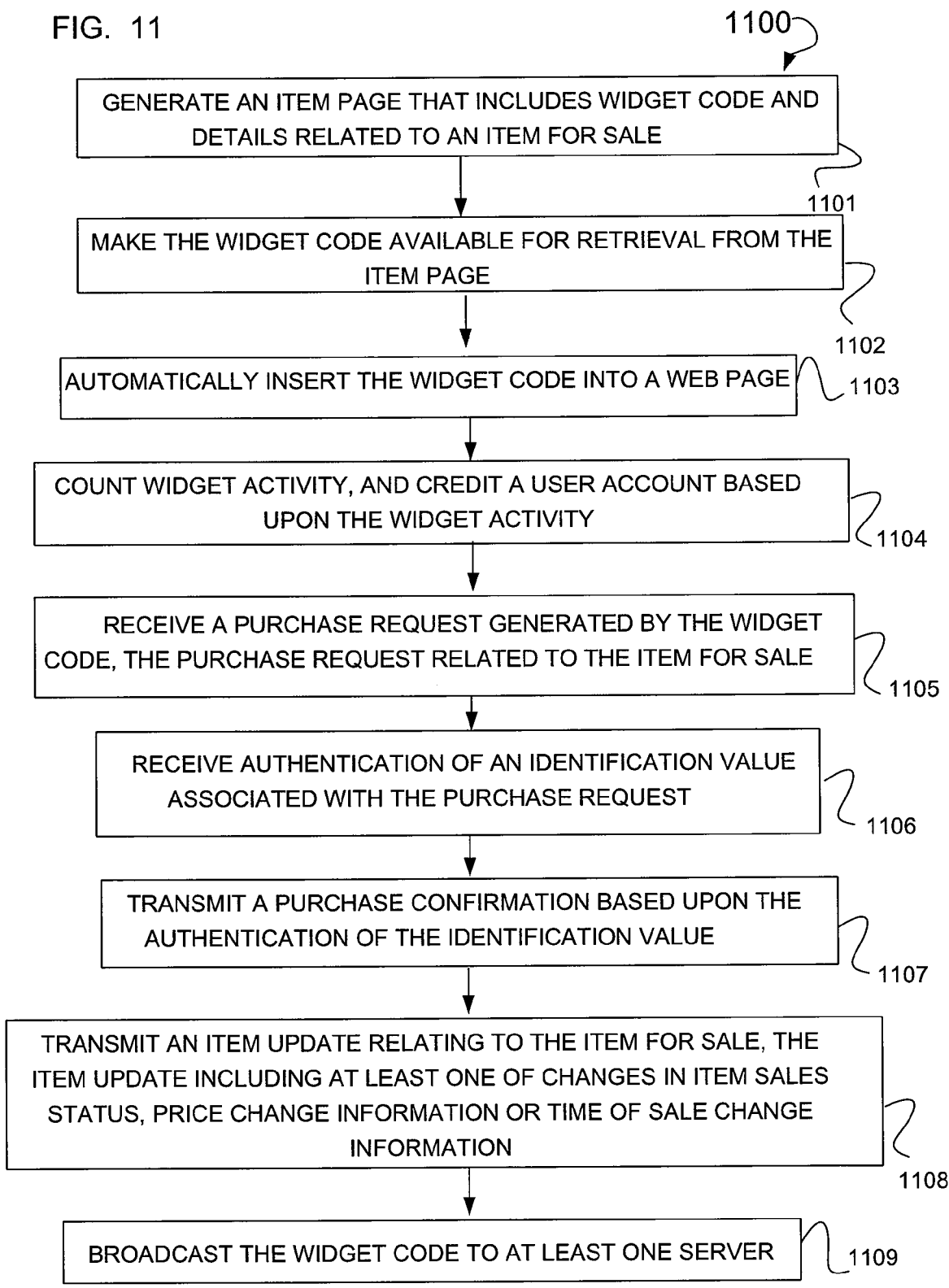
FIG. 11 is a flow chart illustrating a method, according to an example embodiment, used to generate widgets for distributed commerce and viral marketing.

FIG. 11 is a flow chart illustrating an example method 1100 used to generate widgets for distributed commerce and viral marketing. Shown are various operations 1101 through 1109 that may be executed by the commerce server 110. Illustrated is an operation 1101 that, when executed, generates an item page that includes widget code and details related to an item for sale. An operation 1102, when executed, makes the widget code available for retrieval from the item page. An operation 1103 is executed to automatically insert the widget code into a web page. In some example embodiments, the web page is a social networking web page with widget code. Operation 1104, when executed, may include counting widget activity and crediting a user account based upon the widget activity. Some example embodiments may include widget activity that includes at least one of the following: a page view of the item page, a mouse over of the widget code, a click through of the widget code, a sales transaction using the widget code or the creation of an affiliate using the widget code. Operation 1105, when executed, may receive a purchase request generated by the widget code, where the purchase request is related to the item for sale. Operation 1106, when executed, may receive an authentication of an identification value associated with the purchase request. Operation 1107, when executed, may transmit a purchase confirmation based upon the authentication of the identification value. In some example embodiments, the identification value includes a buyer ID, an item ID, seller ID or a widget ID. Operation 1108, when executed, may include transmitting an item update relating to the item for sale, the item update including at least one of changes in item sales status, price change information, or time of sale change information. Operation 1109 may include broadcasting the widget code to at least one server.

Figure 12:
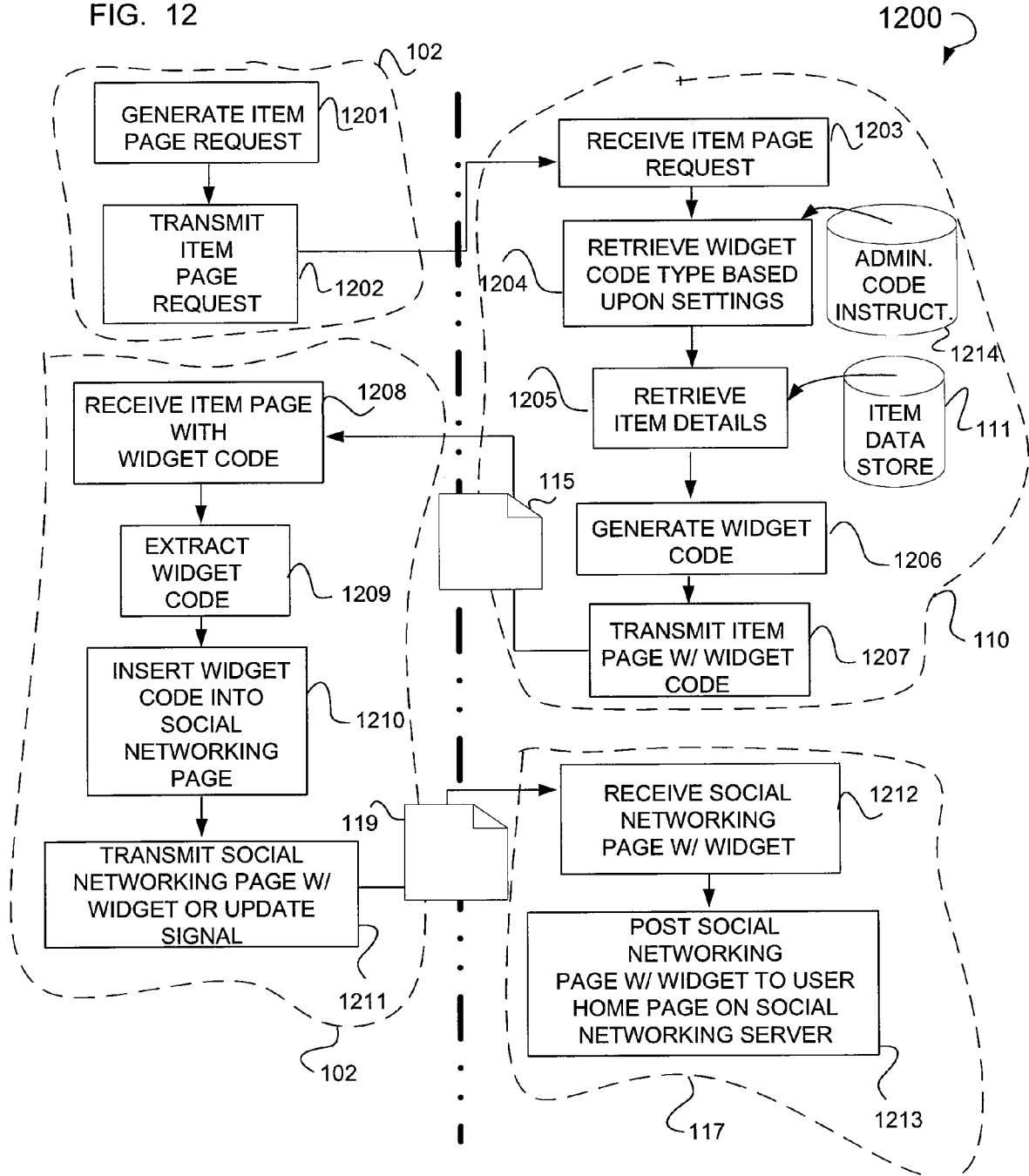
FIG. 12 is a dual-stream flow chart illustrating a method, according to an example embodiment, used by a system to facilitate distributed commerce.

FIG. 12 is a dual-stream flow chart illustrating an example method 1200 used by the system 100 to facilitate distributed commerce. Shown are operations 1201 and 1202 that may reside as a part of the devices 102. When executed, operation 1201 may generate an item page request 109. This operation 1201 may be executed by a user 101 utilizing some type of input device such as a mouse, keyboard, light pen, touch screen, or some other suitable input device. An operation 1202 may be then executed that transmits this item page request 109 across a network to be received through the execution of an operation 1203. This operation 1202, when executed, may generate and format a data packet including ID information that uniquely identifies, for example, an item for which an item page request has been made, such as a user ID, buyer ID, or some other suitable way to identify the user 101. Once the item page request 109 is received, an operation 1204 is executed that retrieves a widget code type based upon settings established by, for example, a system administer. This widget code type may be retrieved from an administrative code instruction data store 1214. This widget code type may be a type identifier to identify the particular type of code or encoding that is used to generate the widget code. For example, a particular type of code may include DHTML, AJAX, of FLASH™ code. An operation 1205 may be executed that retrieves item details from the item data store 111. Item details may include the display area the a widget is to be displayed within, item price, pictures, selling price, duration of sale, or other suitable information. An operation 1206 may be executed that generates widget code based upon the code type and the item details. In some example embodiments, the operation 1206 may be executed as part of the widget server 113. An operation 1207 may be executed that transmits an item page with widget code. In some example embodiments, these various operations and data stores (e.g. operations 1203 to 1207 and data stores 1214 and 111) may reside as a part of, for example, a commerce server 110. Additionally, these various operations 1203 to 1207 and databases (e.g. 1214 and 111) may be executed by, for example, a widget manager 901.

In some example embodiments, the item page with widget code 115 is received through the execution of an operation 1208. An operation 1209 may be executed that extracts widget code from the item page with widget code 115. An operation 1210 may be executed that inserts the widget code into a social networking page. An operation 1211 may be executed that transmits the social networking page with widget code or transmits an update signal (e.g., signals relating to item updates) to be received by the execution operation 1212. Operations 1208 through 1211 may reside as a part of, for example, the devices 102. A social networking page with widget may be received through the execution of operation 1212. In other example embodiments, item updates may be transmitted through the execution of operation 1211 and received through the execution of operation 1212. An operation 1213 is executed to post the social networking page with widget 119 to a user home page on, for example, the social networking servers 117, 204 or 207. The operations 1212 and 1213 may reside as a part of, for example, the social networking server 117, 204 and/or 207.

Figure 13:
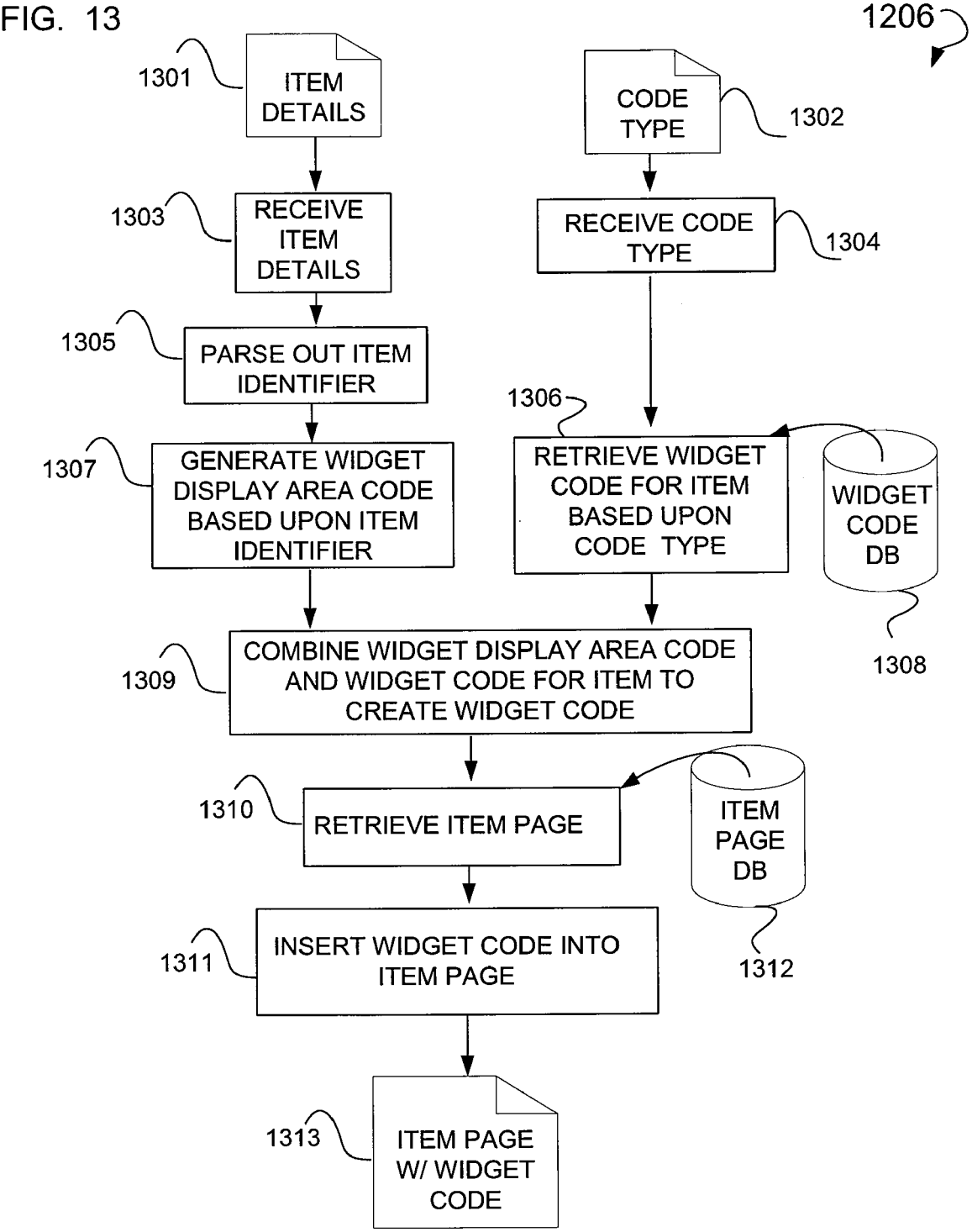
FIG. 13 is a flow chart illustrating the execution of an operation, according to an example embodiment, that generates widget code based upon the code type and item details.

FIG. 13 is a flow chart illustrating the execution of an example operation 1206. Shown are an item details data packet 1301 and a code type data packet 1302. In some example embodiments, an operation 1303 is executed that receives item details data packet 1301. The item details data packet 1301 may include details relating to a CSS used to format the social networking page that the widget is to appear within. An operation 1305 is executed that parses an item identifier from the item details data packet 1301. An operation 1307 is executed that generates a widget display area code based upon information included within item details data packet 1301. The code type data packet 1302 may be received through the execution of operation 1304. An operation 1306 may be executed that retrieves widget code for an item based upon a code type from a widget code database 1308. In some example embodiments, the widget code database 1308 includes pre-written widget code. In other example embodiments, an individual such as, for example, a system administrator, marketing professional, or other suitable person may enter item details directly into a GUI where these details are then compiled or interpreted into widget code and then stored into the widget code database 1308. In some example embodiments, these item details may be retrieved directly from the item data store 111 without the item detail being directly entered by a system administrator, marketing professional, or other suitable person. In some example embodiments, the system administrator, marketing professional, or other suitable person may provide these item details to the widget server 113, which then compiles or interprets these details into the widget code 114. In some example embodiments, the widget code 114 is then stored into a widget code database 1308. In some example embodiments, an operation 1309 is executed that combines the widget display area code and widget code to create widget code that may appear within the text box 601. This widget code is then provided to an operation 1310. Operation 1310, when executed, retrieves an item page from, for example, an item page database 1312. An operation 1311 is then executed that inserts the widget code into the item page so as to generate an item page with widget code 1313. This item page with widget code 1313 may correspond to, for example, the previously illustrated item page with widget code 115.

Figure 14:
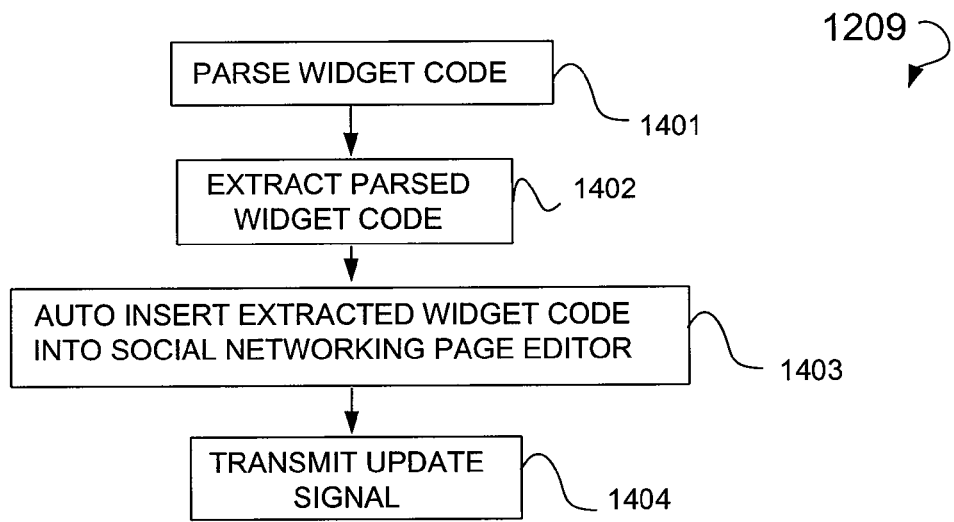
FIG. 14 is a flow chart illustrating the execution of an operation, according to an example embodiment, that extracts widget code from an item page with widget code.

FIG. 14 is a flow chart illustrating the execution of an operation 1209. Shown is an operation 1401 that parses widget code. An operation 1402 may be executed that extracts the parsed widget code. An operation 1403 may be executed that automatically inserts the extracted widget code into a social networking page editor. An operation 1404 may be executed that transmits an updated signal.

In some example embodiments, the process for the retrieval of the widget code and the insertion of this widget code into a social networking page are automated. For example, where this process is automated, a user 101 may need only generate an item page request 109 such that the commerce server 110 may then generate or retrieve the necessary widget code corresponding to the item referenced in the item page request 109. The commerce server 110 may then associate this widget code with a pre-identified social networking page belonging to user 101. In some example embodiments, a script written in, for example, Perl, Python, or some other suitable scripting language may be used to identify and retrieve widget code and to associate this widget code with a social networking page. This script may identify data stores including items data (e.g., item data store 111), widget code (e.g., widget code database 1308), and item pages (e.g., item page database 1312) and retrieve the necessary data to generate, for example, a social networking page with widget 119. In lieu of the automatic insertion of widget code into a social networking page, in some example embodiments, the user 101 as previously discussed, may copy and paste the widget code into a respective social networking page.

Figure 15:
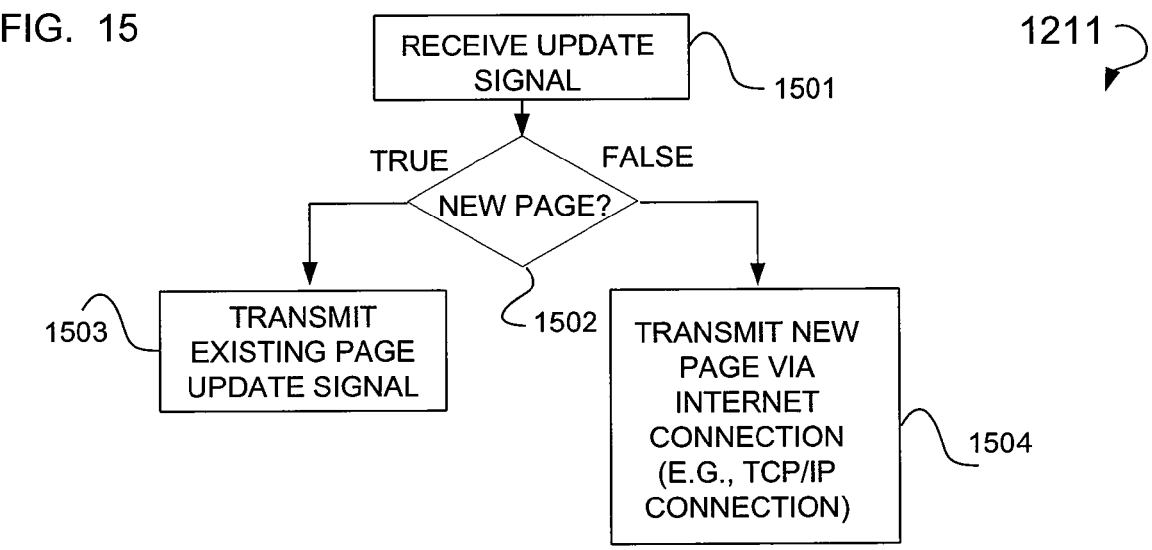
FIG. 15 is a flow chart illustrating the execution of an operation, according to an example embodiment, that transmits a social networking page with widget code or transmits an update signal such as signals.

FIG. 15 is a flow chart illustrating the execution of an example operation 1211. Shown is an operation 1501 that receives an update signal. A decisional operation 1502 is executed that determines whether or not a new page has been generated. A new page refers to a social networking page where item details have changed. In examples where decisional operation 1502 evaluates to "true," an operation 1503 is executed that transmits an existing page update signal. In examples where decisional operation 1502 evaluates to "false," an operation 1504 is executed that transmits a new page via an Internet to, for example, the social networking server 117. An Internet connection as referenced herein may be, for example, a TCP/IP connection, a UDP/IP connection, or some other suitable connection.

Figure 16:
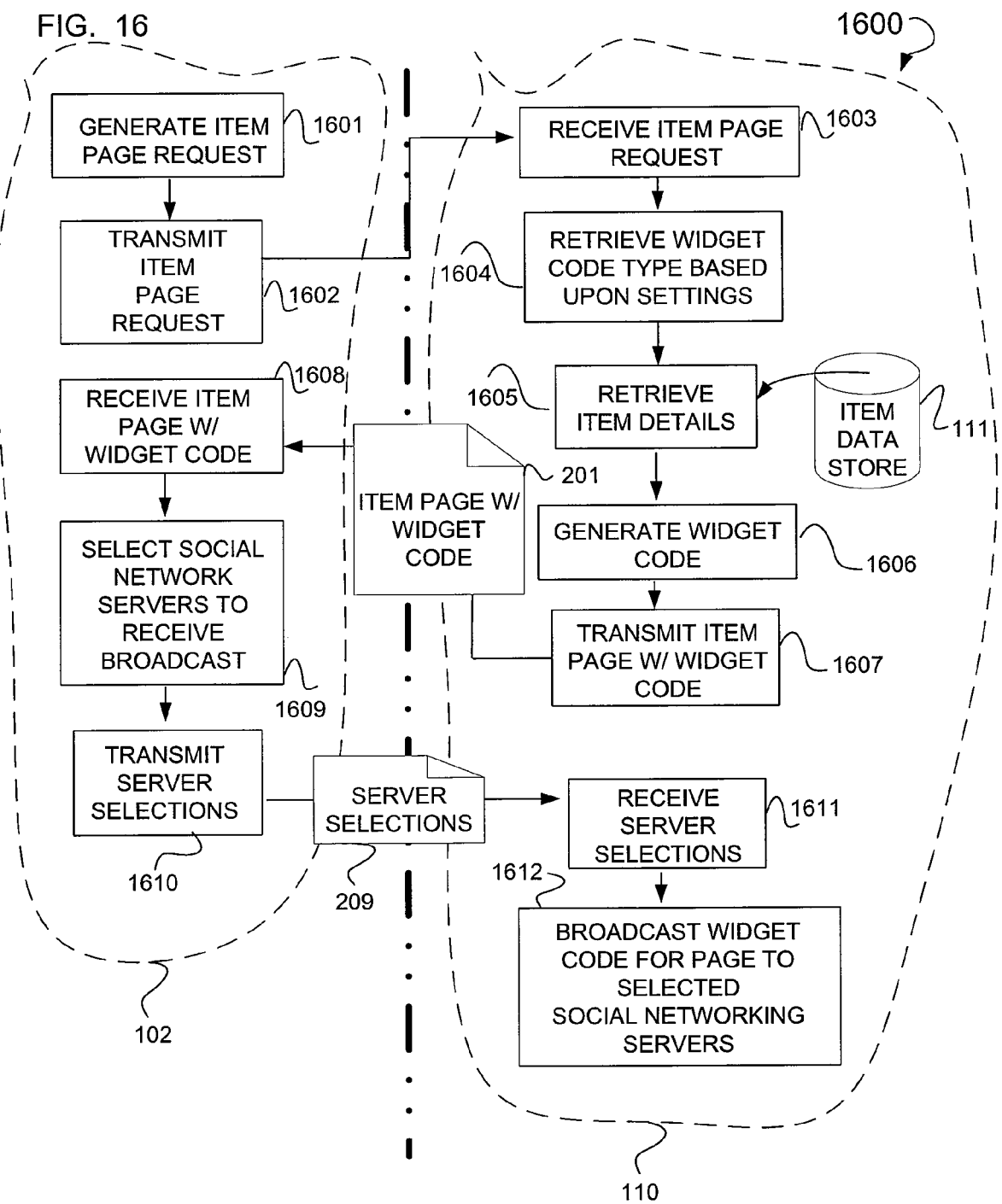
FIG. 16 is a dual-stream flow chart illustrating the execution of a method, according to an example embodiment, used to distribute widget code to a plurality of social networking servers.

FIG. 16 is a dual-stream flow chart illustrating the execution of an example method 1600 used to distribute widget code to a plurality of social networking servers. Shown are operations 1601, 1602, 1608, 1609, and 1610 that may reside as a part of any one of a number of the devices 102. Also shown are various operations 1603, 1604, 1605, 1606, 1607, 1611 and 1612 that may reside as a part of the commerce server 110. In some example embodiments, these various operations 1603 through 1607, and 1611 through 1612 may be executed through, for example, utilizing the widget manager 901. Additionally, in some example embodiments, operation 1606 may be executed by the widget server 113. Operation 1601, when executed, generates an item page request. An operation 1602 is executed to transmit this item page request from the devices 102 to, for example, the commerce server 110. An operation 1603 may be executed that receives this item page request. An operation 1604 may be executed that retrieves a widget code type based upon some type of setting, where the setting may be dictated by a system administrator, or other suitable individual. An operation 1605 may be executed that retrieves item details from, for example, item data store 111. Operation 1606 when executed generates widget code. Operation 1606 may be considered to be akin to operation 1206 when executed. Operation 1607 when executed transmits this item page with widget code as item page with widget code 201 to receive through the execution of operation 1608. An operation 1609 may select a social networking server to receive various broadcasts of widget code for particular social networking pages. An operation 1610 may be executed that transmits server selections 209. In some example embodiments, operation 1609 may select the servers through, for example, a user 101 utilizing some type of input device such as, for example, a mouse, light pen, touch pad, keyboard or other suitable input device.

In some example embodiments, server selections 209 may be transmitted through the execution of operation 1610 received through the execution of operation 1611. An operation 1612 may be executed that broadcast widget codes such as, for example, widget code for page 202, 203, and 206 to various respective social networking servers such as social networking servers 117, 204, and 207. In some example embodiments, the social networking server to which is transmitted the widget code for page 202, 203, and 206 may be transmitted based on multiple social networking accounts held by the user 101 on social networking servers 117, 204, and 207. A social networking account may be an account managed by or controlled by a user such as user 101.

Figure 17:
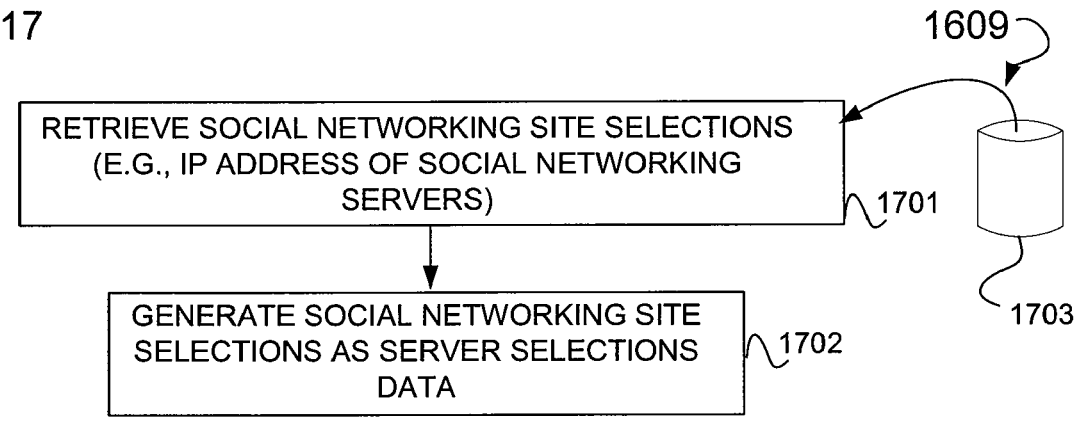
FIG. 17 is a flow chart illustrating the execution of an operation, according to an example embodiment, that selects a social networking server to receive a broadcast of widget code for particular social networking pages.

FIG. 17 is a flow chart illustrating the execution of example operation 1609. Shown is an operation 1701 that, when executed, retrieves a social networking site selection. This social networking site selection may be identified by, for example, an IP address, or other unique identifier that uniquely identifies a social networking server, such as social networking server 117, 204 or 207. These selections may be retrieved from, for example, a data store 1703 where this data store 1703 may be, for example, a cookie, or other suitable data store, or file that may be used to store the uniquely identifying information for a particular social networking server. An operation 1702 may be executed that generates a social networking site selection (e.g., server selections 209) to be transmitted to, for example, a commerce server 110. The server selections 209 may include various header information that may be added by the operation 1610. This header information may include, for example, certain IP address information, Media Access Control (MAC) address information, frame information, or other suitable information as described in, for example, the TCP/IP protocol stack model, or the Open Systems Interconnection (OSI) basic reference model.

Figure 18:
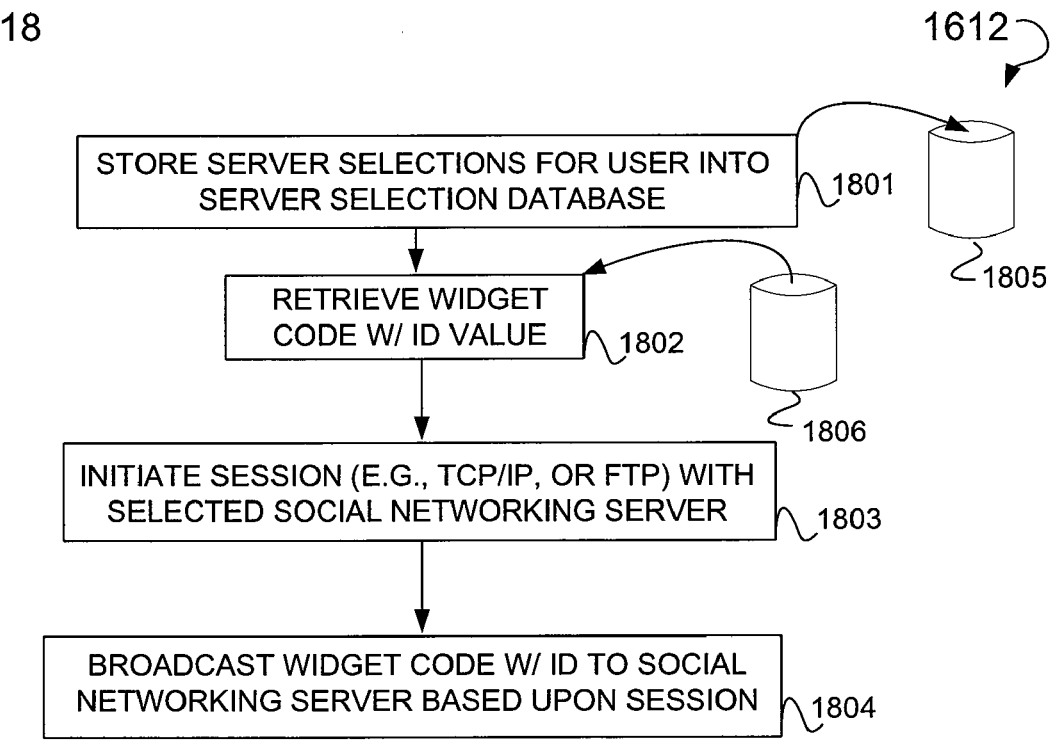
FIG. 18 is a flow chart illustrating a method, according to an example embodiment, used to execute an operation to broadcast widget code to various respective social networking servers.

FIG. 18 is a flow chart illustrating an example method used to execute operation 1612. Shown is an operation 1801 that stores certain server selections for a user into a server selection database 1805. An operation 1802 may be executed that retrieves widget code with an identifier or ID value from, for example, a database 1806. An operation 1803 may be executed that initiates a session with a selected social networking server, where the selection may be, for example, an HTTP, HTTPS, a File Transfer Protocol (FTP) session, or some other suitable session. An operation 1804 may be executed that broadcast widget code with an ID value to social networking server based on the establishment of a session.

Figure 19:
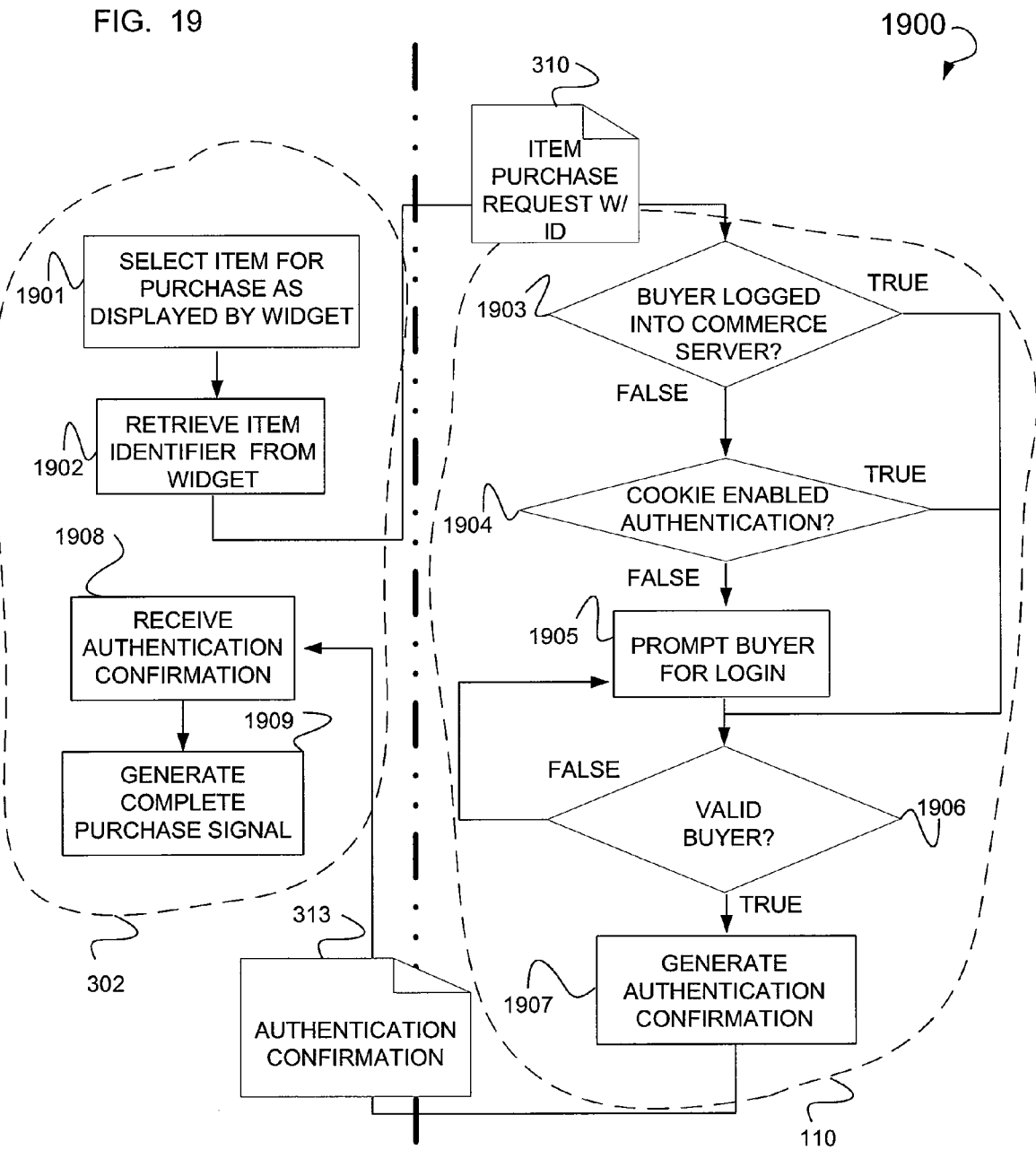
FIG. 19 is a dual-stream flow chart illustrating the execution of a method, according to an example embodiment, to purchase of an item using a widget.

FIG. 19 is a dual-stream flow chart illustrating the execution of an example method 1900 showing the purchase of an item using a widget. Shown are operations 1901, 1902, 1908, and 1909 that may reside as a part of the one or more devices 302. Also shown is a decisional operation 1903, a decisional operation 1904, an operation 1905, a decisional operation 1906, and an operation 1907 that may reside as a part of the commerce server 110. Further, the decisional operations 1903, 1904 and 1906, and operations 1905 and 1907 may be a part of the widget manager 901. Shown is an operation 1901 that, when executed, selects an item for purchase as displayed by a widget. An operation 1902 may then be executed so as to retrieve an item identifier (e.g., item ID) from the widget. This item identifier may be transmitted as a part of an item purchase with the request ID 310 that is transmitted and then received by a decisional operation 1903. In some example embodiments, a separate receive operation (not pictured) may be executed to receive the item purchase request with ID 310. This decisional operation 1903 may determine whether or not a buyer has logged into, for example, the commerce server 110. In instances where the decisional operation 1903 evaluates to "false," a further decisional operation 1904 is executed.

In cases where decisional operation 1903 evaluates to "true," a further decisional operation 1906 is executed. In cases where decisions operation 1904 is executed, the determination is made as to whether or not a cookie has been enabled for authentication purposes. This cookie may be used to authenticate a buyer 301, for example, as having an account that is a part of the commerce service 110. In cases where the buyer 310 is logged on to the commerce server 110 and where cookie authentication has been enabled, a further decisional operation 1906 is executed. In cases where decisional operation 1904 evaluates to "false," an operation 1905 is executed that prompts a buyer, such as buyer 301, for log-in information. This log-in information may include a buyer ID value. In some example embodiments, a decisional operation 1906 may be executed and that determines whether a buyer is valid. A valid buyer may be a buyer capable of purchasing an item. The capability to purchase an item may be based upon the buyer having the financial means to purchase the item.

In cases where decisional operation 1906 evaluates to "false," operation 1905 as previously illustrated may be re-executed in an iterative or recursive manner. When decisional operation 1906 evaluates to "true," an operation 1907 may be executed that generates an authentication confirmation such as authentication confirmation 313 that may be received through the execution of operation 1908. An operation 1909 may be executed that generates a complete purchase signal such that this complete purchase signal may be, for example, the complete purchase 314 and may signify to the commerce server 110 that the buyer 301 wants to consummate the purchase of the particular item described via the widget.

Figure 20:
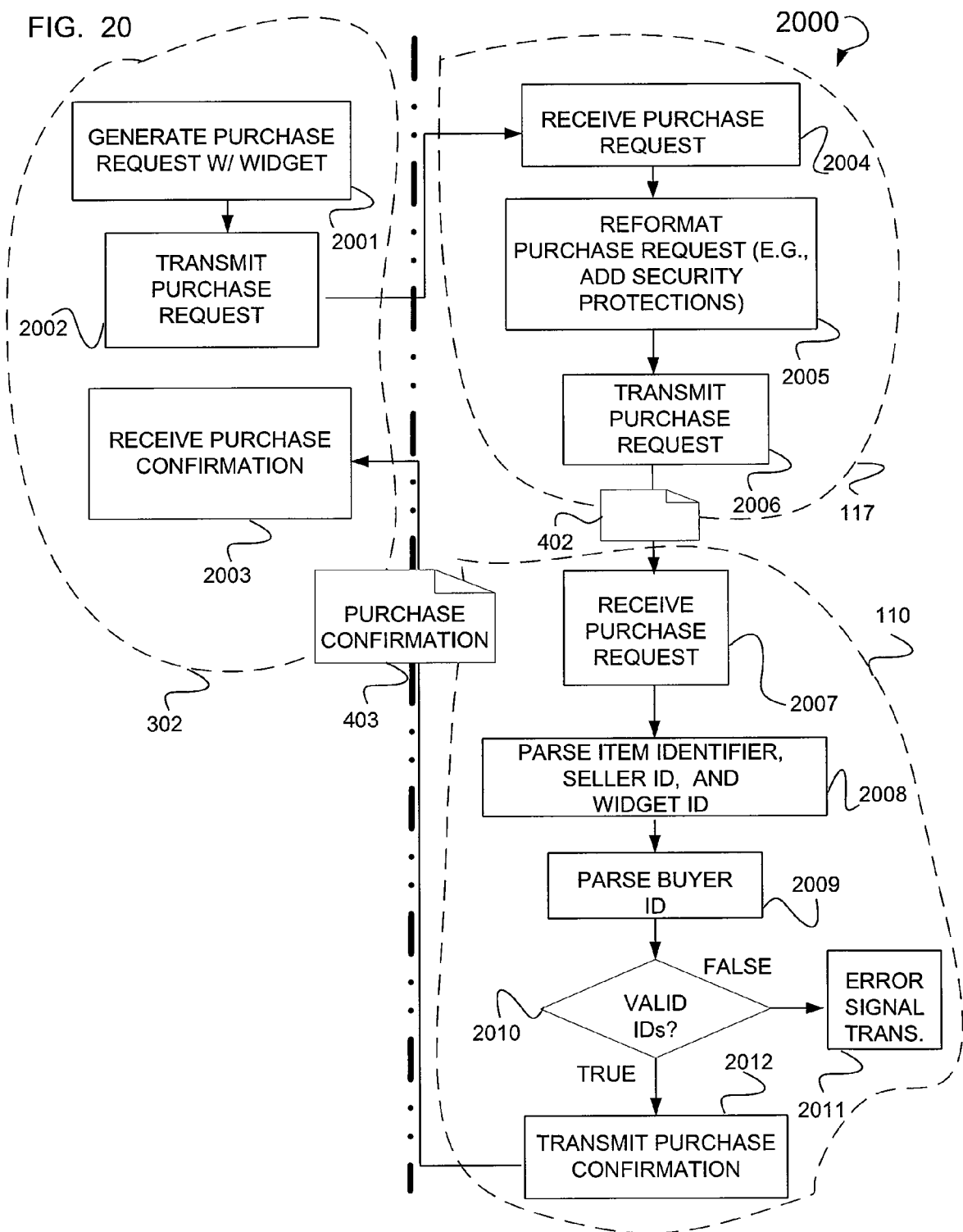
FIG. 20 is a dual-stream flow chart illustrating the execution of a method, according to an example embodiment, used to send a purchase request from a social networking server to a commerce server, and to send a purchase confirmation from a commerce server to the social networking server.

FIG. 20 is a dual-stream flow chart illustrating the execution of an example method 2000 used to send a purchase request from a social networking server to a commerce server and to send a purchase confirmation from a commerce server to the social networking server. Shown are various operations 2001 through 2003 that may reside as a part of any one of the number devices 302. Also shown are a number of operations 2004 through 2006 that may reside as a part of the social networking server 117. Further, shown are number of operations 2007 through 2012 that may reside as a part of the commerce server 110. Operation 2001, when executed, generates a purchase request using a widget 401. An operation 2002 is executed that transmits this purchase request, using the widget 401, to be received through the execution of an operation 2004. Operation 2005 as executed may reformat a purchase request using a widget 401 for transmission by the social networking server 117 as a purchase request using a widget 402. This reformatting process may include the establishment of an HTTP or HTTPS session between the social networking server 117 and the commerce server 110. An operation 2006 may be executed to transmit the purchase request, such as a purchase request using widget 402, across the network such as network 108 to be received through the execution of operation 2007. An operation 2008 may be executed that parses an item identifier, a seller identifier, and/or a widget identifier. An operation 2009 may be executed that parses a buyer identifier. Each one of these identifiers may be included within the purchase request using the widget 402. A decisional operation 2010 may be executed that may determine whether or not these various identifiers relating to items, sellers, buyers, and the widgets are valid. In cases where decisional operation 2010 evaluates to "false," an operation 2011 may be executed that transmits an error signal to the social networking server 117 to notify, for example, the buyer 301 of an error in the purchase. In cases where decisional operation 2010 evaluates to "true," an operation 2012 may be executed to transmit the purchase confirmation 403. In some example embodiments, the decisional operation 2010 may reside as part of the security server 320. Operation 2012, when executed, may transmit a purchase confirmation such as purchase confirmation 403 to be received through the execution of operation 2003. In some example embodiments, the operations 2007 through 2012 may be managed by an account manager 902.

Figure 21:
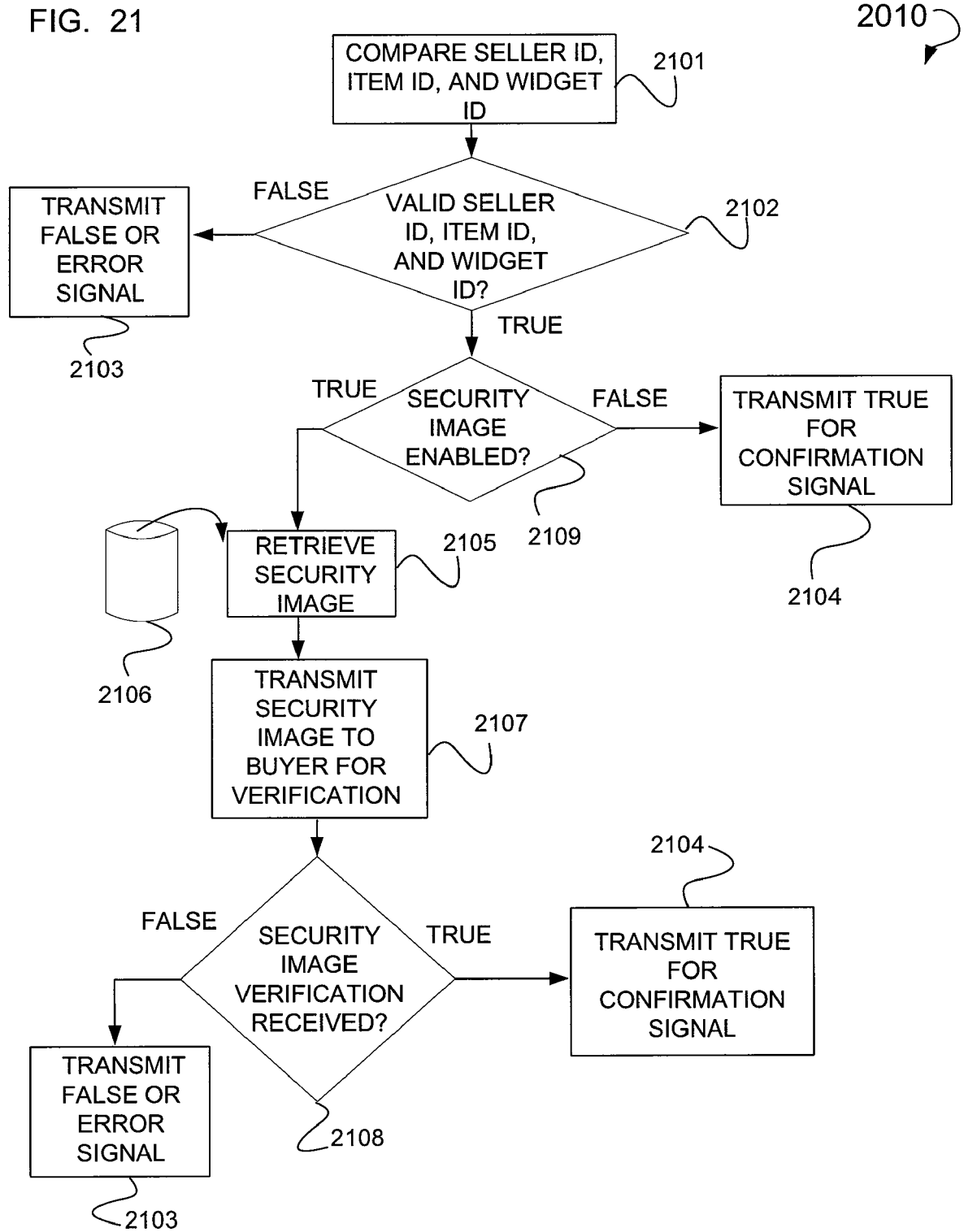
FIG. 21 is a flow chart illustrating the execution of an operation, according to an example embodiment, that may determine whether or not various identifiers relating to items, sellers, buyers, and widgets are valid.

FIG. 21 is a flow chart illustrating the example execution of operation 2010. Shown is an operation 2101 that, when executed, may compare a seller ID, item ID, buyer ID, and/or widget ID. A decisional operation 2102 may be executed that determines whether or not a seller ID, item ID, widget ID or a buyer ID is valid. In cases where decisional operation 2102 evaluates to "false," an operation 2103 is executed that transmits a false or error signal. In cases where decisional operation 2102 evaluates to "true," a decisional operation 2109 is executed that determines whether or not a security image functions is enabled. In some example embodiments, a buyer or seller may be prompted with an image prior to consummating the purchase of an item. In cases where the decisional operation 2109 evaluates to "false," an operation 2104 may be executed that transmits a true signal such that a purchase confirmation 403 may be generated. In cases where decisional operation 2109 evaluates to "true," an operation 2105 may be executed that may retrieve security image from image data store 2106. The images included within this image data store may include: a Joint Photographic Experts Group (JPEG) based image, text or alpha-numeric values. An operation 2107 may be executed that transmits a security image to a buyer for verification. Decisional operation 2108 may be executed that determines whether or not the security image transmitted to the buyer ID or, in some cases, the seller ID has been verified. Verification may take the form of the buyer or seller correctly selecting a name or title of the image displayed for verification. Further, verification may take the form of the buyer or seller entering into a text boxes a correct text or alpha-numeric sequence of characters as reflected in the displayed image. In cases where decisional operation 2108 evaluates to "false," an operation 2103 is executed that facilitates the transmission of a false or error signal. In cases where decisional operation 2108 evaluates to "true," the previously referenced operation 2104 may be executed. In some example embodiments, decisional operation 2102 may utilize any one of a number of technologies including, for example, a Security Assertion Markup Language (SAML), asymmetric or symmetric encryption, hashing, digital signatures, or some others suitable way to verify the identity of a seller, an item or widget or a buyer.

Figure 22:
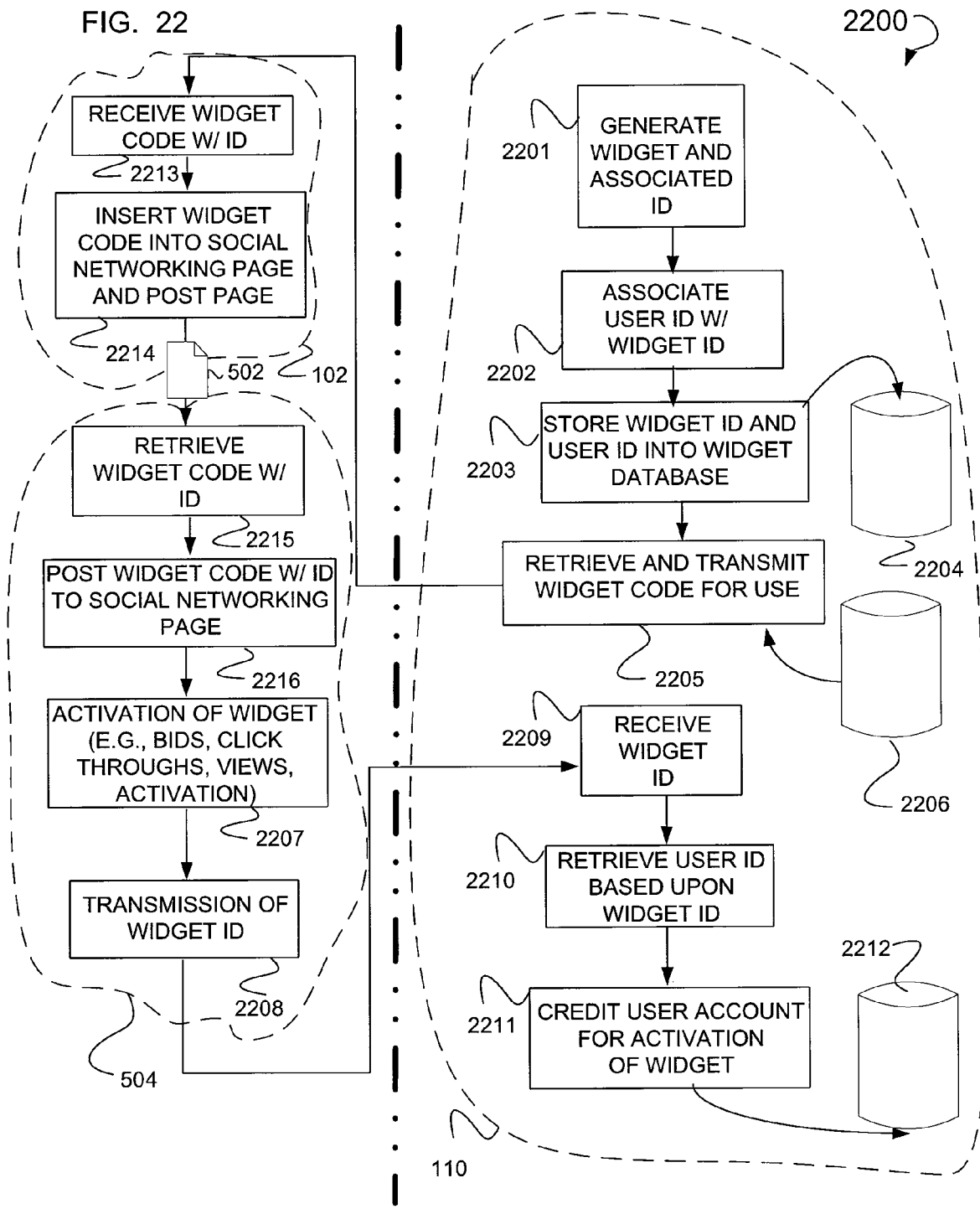
FIG. 22 is a dual-stream flow chart illustrating a method, according to an example embodiment, used to facilitate viral marketing.

FIG. 22 is a dual-stream flow chart illustrating an example method 2200 used to engage in viral marketing. Shown are operations 2213 and 2214 that may reside as a part of the devices 102. Also shown are operations 2215, 2216, 2207 and 2208 that may reside as a part of the devices 504. Also shown are operations 2201, 2202, 2203, 2205, 2209, 2210 and data stores 2204 and 2206 that may reside as a part of the commerce server 110. In some example embodiments, an operation 2201 is executed that generates widget code and an associated ID value. An operation 2202 may be executed that associates a user ID value with a widget code ID value. This association may take the form of a shared numeric or alpha-numeric key value that is shared by the user ID value and widget code ID value in addition to or in lieu of the ID values themselves. An operation 2203 may be executed that stores the widget ID and user ID into a widget database 2204 (e.g., the previously referenced data store 2204). An operation 2205 may be executed that retrieves and transmits widget code for use from, for example, the database 2206. An operation 2213 may be executed that receives a widget code with an ID value. An operation 2214 may be executed that inserts the widget code into social networking page and post the page for viewing by potential buyers or users 503 and 517. This posting process may involve the use of the copied widget code with ID 502 being received from the execution of operation 2215. An operation 2216 may be executed that posts the widget code with an ID to a social networking page. An operation 2207 may be executed that detects the activation of the widget, wherein this activation may be in the form of, for example, bids, click-throughs, views, actual activation, or some other way to denote that the widget code is accessed or otherwise activated. In some example embodiments, a recording application (not pictured) counts the number of times (e.g., a count value) a URL included within the widget code has been activated. This recording application may store a count value in a database 2212. An operation 2208 may be executed that transmits the widget ID to be received through the execution of operation 2209. An operation 2210 may be executed that retrieves a user ID based upon the widget ID. This user ID may be retrieved from, for example, the widget database 2204 (not pictured). An operation 2211 may be executed that credits a user account for the activation of a widget (e.g., a based upon a count value) where this account is stored in, for example, a database 2212. In some example embodiments, the various operations 2201 to 2203, operation 2205, 2209, 2210, 2211 and the widget database 2204, database 2206 and database 2212 may reside or otherwise be managed by for example an account manager 902.

Example Storage

Some embodiments may include the various databases (e.g., 111, 118, 205, 208, 1214, 1308, 1312, 1703, 1805, 2106, 2204 or 2206) being relational databases, or in some cases OLAP based databases. In the case of relational databases, various tables of data are created and data is inserted into, and/or selected from, these tables using SQL, or some other database-query language known in the art. In the case of OLAP databases, one or more multi-dimensional cubes or hypercubes including multidimensional data from which data is selected from or inserted into using MDX may be implemented. In the case of a database using tables and SQL, a database application such as, for example, MYSQL™, SQLSERVER™, Oracle 81™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 23:
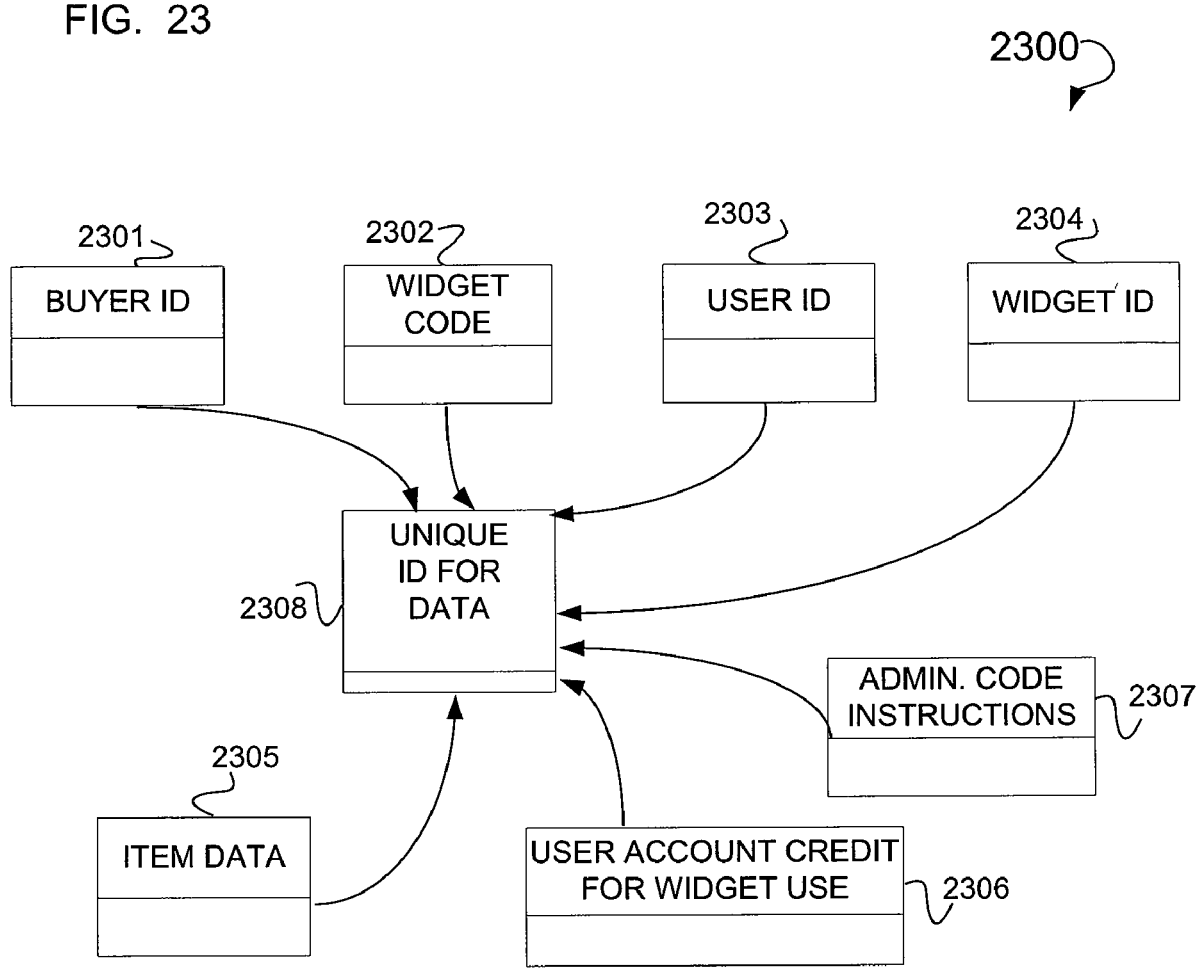
FIG. 23 is a Relational Data Scheme (RDS), according to an example embodiment, illustrating some of the tables of data may be utilized by some embodiments of the present system and method disclosed herein.

FIG. 23 is an example RDS 2300 illustrating some of the tables that data may be utilized by some embodiments of the present system and method disclosed herein. Shown is a table 2301 including a buyer ID. This buyer ID may uniquely identify a buyer. This ID may be for example an alpha-numeric value or some type of 128 bit based value, 256 bit based value that may be stored as, for example, a Binary Large Object (BLOB), a string, a integer, or some other suitable value or data type. A table 2302 is also illustrated including widget code. This widget code may be stored as, for example, a string data type, an XML data type, a BLOB data type, or some other suitable data type. A table 2303 is shown that includes a user ID value, where this user identifier may be some type of unique value to identify a user that may include a 128 bit value, a 256 bit value, an alpha-numeric value or some other suitable value. Data types used to store the values included within the table 2303 may include for example strings, integers, BLOBs, or other suitable data types. A table 2304 is shown including a widget ID values. This widget ID values may be, for example, alpha-numeric ID values, 128 bit or 256 bit values, or some other suitable values used to uniquely identify a widget. Further, various data types may be used by this table 2304 including, for example, a string data type, an alpha-numeric data type, a BLOB data type or some other suitable data type.

In some example embodiments, a table 2305 is shown including item data. This item data may include data describing a particular item for sale as advertised by, for example, the commerce server 110. This item data may include data relating to seller contact information, price description, time of sale, deadline for sale, or other suitable information. Data types including, for example, XML data types, HTML data types or other suitable data types may be used to store the data included within the table 2305. A table 2306 is also shown that includes user account credit data for a particular widget use. Included within this table 2603 may be, for example, a user ID and a widget ID, or other new information used to uniquely identify or associate a user and a widget. Data types used to store data within this table 2306 may include, for example, a string, integer, 128 bit value, 256 bit value, a BLOB, or other suitable data type. Table 2307 is also shown that includes administrative codes for coding instructions. This table 2307 may include data relating to the particular code type in which a particular widget is to be written. This data may be formatted using a string data type, XML data type, or some other suitable data type. A table 2308 is shown that includes a unique ID for data. Some example embodiments for table 2308 includes various key values to uniquely identify data included in each of the previously illustrated tables (e.g., tables 2301 through 2307). The data types used to uniquely identify each one of the types of data included in each of these tables 2301 through 2307 may include, for example, an integer float, BLOB, or other suitable data type.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage, tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system including a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an Internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

Figure 24:
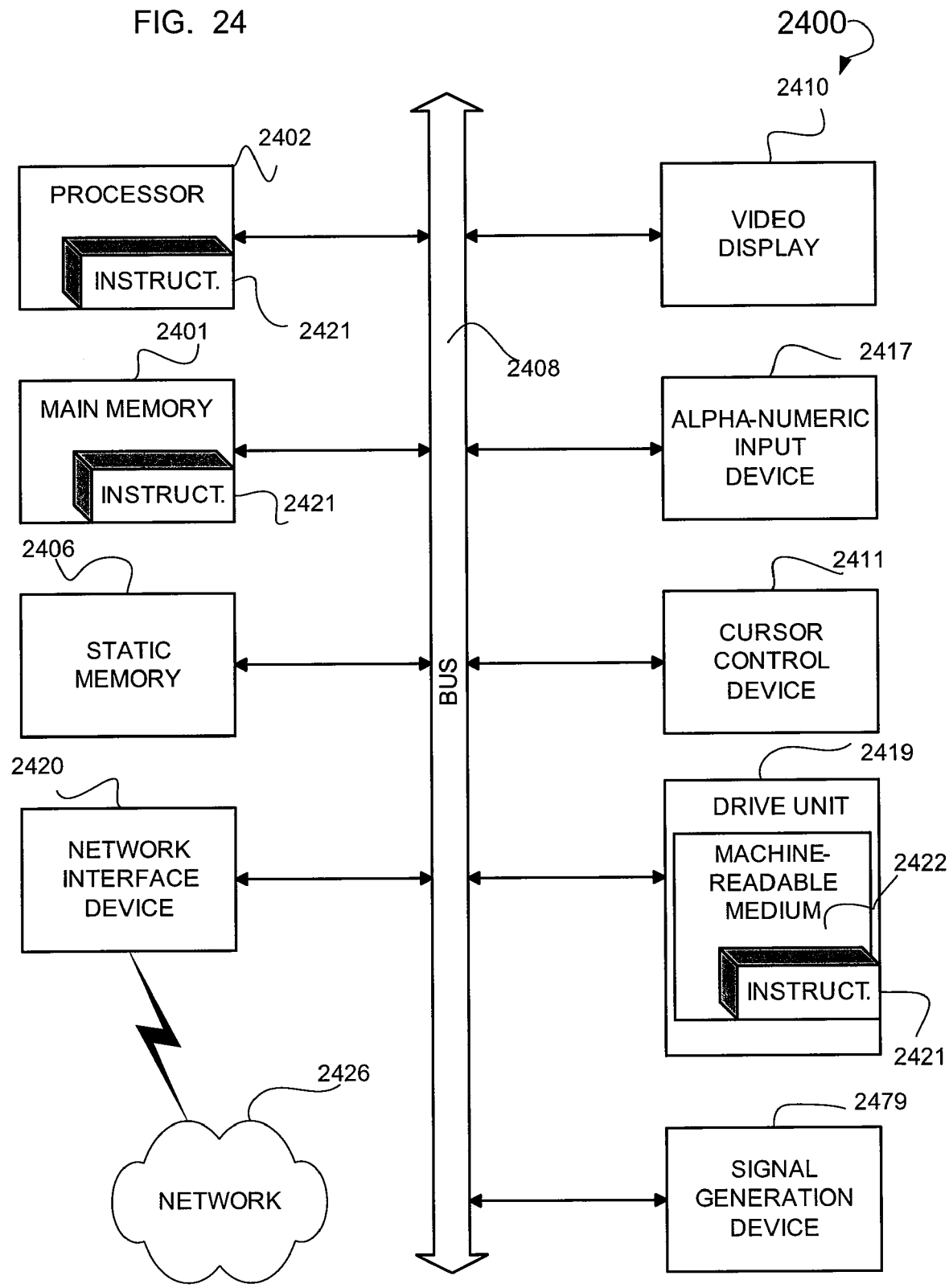
FIG. 24 shows a diagrammatic representation of a machine in the example form of a computer system, according to an example embodiment.

FIG. 24 shows a diagrammatic representation of a machine in the example form of a computer system 2400 that executes a set of instructions to perform any one or more of the methodologies discussed herein. One of the devices 102 may configured as a computer system 2400. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC). Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2400 includes a processor 2402 (e.g., a Central Processing Unit (CPU), a Graphics Processing Unit (GPU) or both), a main memory 2401, and a static memory 2406, which communicate with each other via a bus 2408. The computer system 2400 may further include a video display unit 2410 (e.g., a Liquid Crystal Display (LCD) or a Cathode Ray Tube (CRT)). The computer system 2400 may also includes an alpha-numeric input device 2417 (e.g., a keyboard), a GUI cursor controller 2411 (e.g., a mouse), a disk drive unit 2419, a signal generation device 2479 (e.g., a speaker) and a network interface device (e.g., a transmitter) 2420.

The disk drive unit 2416 includes a machine-readable medium 2422 on which is stored one or more sets of instructions 2421 and data structures (e.g., software) embodying or used by any one or more of the methodologies or functions illustrated herein. The software may also reside, completely or at least partially, within the main memory 2401 and/or within the processor 2402 during execution thereof by the computer system 2400, the main memory 2401 and the processor 2402 also constituting machine-readable media.

The instructions 2421 may further be transmitted or received over a network 2426 via the network interface device 2420 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, a system and method is shown that facilitates the purchase of goods and services through the use of widgets displayed on web pages. These web pages may include web pages appearing one social networking servers. These widgets may be distributed virally by users copying the code associated with the widget manually or automatically and inserting this code into a web page. A user may receive some type of monetary compensation for inserting the widget code into a web page. Further, the user may receive monetary compensation each time the widget is activated. Various widget IDs, user IDs, buyer IDs, seller IDs may be used to track widget, user, buyer and seller activity.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   generating an item page that includes widget code and item details related to an item for sale, the widget code being an executable object for placement by a user into a webpage that, when executed, causes a sales transaction to be completed;
   making the widget code available for retrieval from the item page;
   receiving a purchase request generated by the widget code, the purchase request being a request to purchase the item for sale; and
   receiving authentication of an identification value, the identification value being associated with the purchase request.

2. The computer implemented method of claim 1, further comprising automatically inserting the widget code into a web page.

3. The computer implemented method of claim 2, wherein the web page is a social networking web page with widget code.

4. The computer implemented method of claim 1, further comprising counting widget activity, and crediting a user account based upon the widget activity.

5. The computer implemented method of claim 1, wherein the widget activity includes at least one of the following: a page view of the item page, a mouse over of the widget code, a click through of the widget code, a sales transaction using the widget code or the creation of an affiliate using the widget code.

6. The computer implemented method of claim 1, further comprising
transmitting a purchase confirmation based upon the authentication of the identification value.

7. The computer implemented method of claim 1, further comprising transmitting an item update relating to the item for sale, the item update including at least one of: changes in item sales status, price change information or time of sale change information.

8. The computer implemented method of claim 1, further comprising broadcasting the widget code to at least one server.

9. A computer system comprising:
a widget engine to generate, using one or more processors, an item page that includes widget code and details related to an item for sale, the widget code being an executable object for placement by a user into a webpage that, when executed, causes a sales transaction to be completed;
a posting engine to make the widget code available for retrieval from the item page;
a first receiver to receive a purchase request generated by the widget code, the purchase request a request to purchase the item for sale; and
a second receiver to receive authentication of an identification value, the identification value being associated with the purchase request.

10. The computer system of claim 9, further comprising an insertion engine to automatically insert the widget code into a web page.

11. The computer system of claim 10, wherein the web page is a social networking web page with widget code.

12. The computer system of claim 9, further comprising a counter to count widget activity and to credit a user account based upon the widget activity.

13. The computer system of claim 9, wherein the widget activity includes at least one of the following: a page view of the item page, a mouse over of the widget code, a click through of the widget code, a sales transaction using the widget code or the creation of an affiliate using the widget code.

14. The computer system of claim 9, further comprising
a first transmitter to transmit a purchase confirmation based upon the authentication of the identification value.

15. The computer system of claim 9, further comprising a second transmitter to transmit an item update relating to the item for sale, the item update including at least one of changes in item sales status, price change information or time of sale change information.

16. The computer system of claim 9, further comprising a broadcast engine to broadcast the widget code to at least one server.

17. An apparatus comprising:
means for generating an item page that includes widget code and details related to an item for sale, the widget code being an executable object for placement by a user into a webpage that, when executed, causes a sales transaction to be completed;
means for making the widget code available for retrieval from the item page;
means for receiving a purchase request generated by the widget code, the purchase request a request to purchase the item for sale; and
means for receiving authentication of an identification value, the identification value being associated with the purchase request.

18. A non-transitory machine-readable medium comprising instructions, which when implemented by one or more machines cause the one or more machines to perform the following operations comprising:
generating an item page that includes widget code and details related to an item for sale, the widget code being an executable object for placement by a user into a webpage that, when executed, causes a sales transaction to be completed; and
making the widget code available for retrieval from the item page;
receiving a purchase request generated by the widget code, the purchase request being a request to purchase the item for sale; and
receiving authentication of an identification value, the identification value being associated with the purchase request.

* * * * *